(12) United States Patent
Sano et al.

(10) Patent No.: US 9,797,774 B2
(45) Date of Patent: Oct. 24, 2017

(54) SPECTROMETRY SYSTEM, SPECTROSCOPIC MODULE, AND POSITIONAL DEVIATION DETECTION METHOD

(71) Applicant: Seiko Epson Corporation, Tokyo (JP)

(72) Inventors: Akira Sano, Shiojiri (JP); Takashi Nagate, Suwa (JP); Kazunori Sakurai, Chino (JP); Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/580,848

(22) Filed: Dec. 23, 2014

(65) Prior Publication Data
US 2015/0185081 A1    Jul. 2, 2015

(30) Foreign Application Priority Data

Dec. 27, 2013 (JP) .................... 2013-270763

(51) Int. Cl.
| | | |
|---|---|---|
| *G01J 3/28* | (2006.01) | |
| *G01J 3/02* | (2006.01) | |
| *G01J 3/45* | (2006.01) | |
| *G01J 3/26* | (2006.01) | |
| *G01J 3/32* | (2006.01) | |

(52) U.S. Cl.
CPC ........... *G01J 3/2823* (2013.01); *G01J 3/0202* (2013.01); *G01J 3/027* (2013.01); *G01J 3/0235* (2013.01); *G01J 3/0272* (2013.01); *G01J 3/0289* (2013.01); *G01J 3/0291* (2013.01); *G01J 3/26* (2013.01); *G01J 3/28* (2013.01); *G01J 3/32* (2013.01)

(58) Field of Classification Search
CPC ........... G01J 3/2823; G01J 3/45; G01J 3/0289
See application file for complete search history.

(56) References Cited

U.S. PATENT DOCUMENTS

| | | |
|---|---|---|
| 5,461,477 A | 10/1995 | Marinelli et al. |
| 8,130,380 B2 | 3/2012 | Saari |
| 8,289,520 B2 | 10/2012 | Kraus et al. |
| 8,786,861 B2 | 7/2014 | Funamoto |

(Continued)

FOREIGN PATENT DOCUMENTS

| | | |
|---|---|---|
| JP | 04-125429 A | 4/1992 |
| JP | 2000-162043 A | 6/2000 |

(Continued)

OTHER PUBLICATIONS

Amnon Yariv, Basis of Optical Electronics, 5th Edition, published in Japan by Maruzen Inc. on Sep. 15, 1982, pp. 57-60.

*Primary Examiner* — Kara E Geisel
*Assistant Examiner* — Dominic J Bologna
(74) *Attorney, Agent, or Firm* — Harness, Dickey & Pierce, P.L.C.

(57) ABSTRACT

A spectrometry system includes an imaging apparatus that includes an imaging element which captures an image, and a spectroscopic module that includes a wavelength variable interference filter and an attachment unit which holds the wavelength variable interference filter, is provided to be attachable to and detachable from the imaging apparatus, and can dispose the wavelength variable interference filter on an optical path of incident light to the imaging element during attachment to the imaging apparatus.

15 Claims, 18 Drawing Sheets

(56) References Cited

U.S. PATENT DOCUMENTS

| | | | |
|---|---|---|---|
| 2003/0058520 A1 | 3/2003 | Yu et al. | |
| 2004/0013356 A1 | 1/2004 | Wang et al. | |
| 2005/0046837 A1 | 3/2005 | Izumi et al. | |
| 2009/0009945 A1* | 1/2009 | Johnson | G06F 1/1613 361/679.27 |
| 2010/0208257 A1* | 8/2010 | Shibayama | G01J 3/02 356/326 |
| 2010/0245832 A1* | 9/2010 | Saari | G01J 3/02 356/454 |
| 2011/0117025 A1 | 5/2011 | Dacosta et al. | |
| 2012/0109584 A1 | 5/2012 | Urushidani | |
| 2012/0307241 A1* | 12/2012 | Maity | G01J 3/02 356/326 |
| 2012/0320340 A1 | 12/2012 | Coleman, III | |
| 2013/0229646 A1 | 9/2013 | Sakurai | |
| 2014/0092492 A1* | 4/2014 | Topliss | G02B 7/08 359/823 |
| 2014/0354802 A1* | 12/2014 | Ohtomo | G02B 27/126 348/135 |
| 2014/0375996 A1 | 12/2014 | Urushidani | |
| 2015/0029604 A1* | 1/2015 | Chalenko | G03B 17/566 359/813 |
| 2015/0086117 A1* | 3/2015 | Comstock, II | G06K 9/46 382/191 |
| 2016/0045114 A1 | 2/2016 | Dacosta et al. | |

FOREIGN PATENT DOCUMENTS

| | | |
|---|---|---|
| JP | 2000-206037 A | 7/2000 |
| JP | 2000-266605 A | 9/2000 |
| JP | 2001-221686 A | 8/2001 |
| JP | 2001-296180 A | 10/2001 |
| JP | 2006-303955 A | 11/2006 |
| JP | 2009-210312 A | 9/2009 |
| JP | 2010-085408 A | 4/2010 |
| JP | 2010-271246 A | 12/2010 |
| JP | 2011-002376 A | 1/2011 |
| JP | 2011-521237 A | 7/2011 |
| JP | 2012-093275 A | 5/2012 |
| JP | 2012-103208 A | 5/2012 |
| JP | 2013-033006 A | 2/2013 |
| JP | 2013-109055 A | 6/2013 |
| JP | 2013-170867 A | 9/2013 |
| JP | 2013-181912 A | 9/2013 |
| JP | 3185803 U | 9/2013 |
| JP | 2014-035190 A | 2/2014 |

* cited by examiner

SPECTROMETRY SYSTEM, SPECTROSCOPIC MODULE, AND POSITIONAL DEVIATION DETECTION METHOD

BACKGROUND

1. Technical Field

The present invention relates to a spectrometry system, a spectroscopic module, and a positional deviation detection method.

2. Related Art

In the related art, a spectrometry apparatus (refer to U.S. Pat. No. 8,130,380) is known in which an imaging element receives light beams which are spectrally separated by a spectroscopic element, and a spectral measurement is performed by acquiring an amount of received light.

The spectrometer (spectrometry apparatus) disclosed in U.S. Pat. No. 8,130,380 integrally includes an interferometer (wavelength variable interference filter) in which a pair of optical elements are disposed to face each other, and light transmission characteristics can be changed by changing a gap between the optical elements, and a detector (imaging element).

In the spectrometry apparatus of the related art as disclosed in U.S. Pat. No. 8,130,380, the spectroscopic element and the imaging element are integrally incorporated into the apparatus. For this reason, the apparatus can be designed in advance as a spectrometry apparatus which is specialized for a spectral measurement and be manufactured. Therefore, in such a spectrometry apparatus, generally, it is possible to easily improve measurement accuracy.

However, a spectrometry apparatus which is manufactured to perform a high accuracy measurement is typically expensive. In addition, such a spectrometry apparatus is specialized for a spectral measurement, and thus there are cases where the apparatus is not suitable for applications (for example, imaging in a state in which spectral separation is not performed) other than the spectral measurement and has low versatility. As mentioned above, the spectrometry apparatus of the related art may have low versatility, and thus wide spread thereof is generally difficult.

SUMMARY

An advantage of some aspects of the invention is to provide a spectrometry system, a spectroscopic module, and a positional deviation detection method, capable of improving versatility.

An aspect of the invention is directed to a spectrometry system including an imaging apparatus that includes an imaging element which captures an image; and a spectroscopic module that includes a spectroscopic unit which selectively emits light with a predetermined wavelength from incident light and can change a wavelength of the emitted light; and an attachment unit which holds the spectroscopic unit, is provided to be attachable to and detachable from the imaging apparatus, and disposes the spectroscopic unit on an optical path of incident light to the imaging element during attachment to the imaging apparatus.

In the spectrometry system according to the aspect of the invention, the spectroscopic module is configured to be attachable to and detachable from the imaging apparatus.

In this configuration, the spectroscopic module and the imaging apparatus can be formed as separate bodies. As the imaging apparatus, an apparatus such as a digital camera or a smart phone which is generally wide spread and has an imaging function may be used. Therefore, it is possible to provide the spectrometry system with high versatility.

In the spectrometry system according to the aspect of the invention, it is preferable that the attachment unit includes a positioning portion that holds the spectroscopic unit, and positions the spectroscopic unit with respect to an optical axis of the incident light during the attachment.

According to the aspect of the invention with this configuration, when the spectroscopic module is attached to the imaging apparatus, the spectroscopic unit can be positioned with respect to an optical axis of incident light by the positioning portion. Here, the positioning portion determines an angle of the spectroscopic unit with respect to the optical axis or a position thereof in a direction intersecting the optical axis.

If a deviation exceeding an allowable range occurs in a position or an angle of the spectroscopic unit with respect to an incidence optical axis, there is a concern that accuracy of a spectral measurement may be reduced. For example, in a case where a Fabry-Perot etalon is used as the spectroscopic unit, if an angle of incident light changes, a selection wavelength changes. In addition, if a positional deviation occurs in the direction intersecting the optical axis, there is a concern that light may be incident to regions other than an effective region which functions as a Fabry-Perot etalon. As mentioned above, a position or an angle of the spectroscopic unit changes, and thus there is a concern that a spectral measurement may not be performed with desired accuracy. In contrast, in the aspect of the invention, positioning is performed, and thus it is possible to minimize the occurrence of the defect.

In the spectrometry system according to the aspect of the invention, it is preferable that the positioning portion includes a spectroscopic holding section that holds the spectroscopic unit; an abutting section that is provided at the spectroscopic holding section, protrudes toward the imaging apparatus from the spectroscopic holding section, and has a front end surface in a protrusion direction to abut on the imaging apparatus; and a biasing section that biases the spectroscopic holding section toward the imaging apparatus side.

In the aspect of the invention with this configuration, the spectroscopic holding section is biased by the biasing section, and thus the abutting section provided at the spectroscopic holding section abuts on the imaging apparatus. Consequently, the spectroscopic unit held in the spectroscopic holding section is positioned. In this configuration, if the spectroscopic module has only to be attached to the imaging apparatus, it is possible to position the spectroscopic unit even if complex setting operations are not performed. With the simple configuration in which the spectroscopic holding section provided with the abutting section is biased toward the imaging apparatus side by the biasing section, it is possible to position the spectroscopic unit.

In the spectrometry system according the aspect of the invention, it is preferable that the attachment unit includes a base at which the spectroscopic unit is provided, and that is disposed along a surface of the imaging apparatus on a light incidence side; and a sidewall that is connected to the base, and covers a side surface of the imaging apparatus along an optical axis of the incident light during the attachment, and a plurality of protrusions which protrude in a direction intersecting the optical axis, and abut on the side surface during the attachment are provided on an inner surface of the sidewall.

According to the aspect of the invention with this configuration, the attachment unit is attached to the imaging apparatus in a state in which the side surface of the imaging apparatus is covered with the sidewall of which the plurality of protrusions are provided on the inner surface. At this time, the attachment unit is attached to the imaging apparatus in a state in which the protrusions abut on the side surface of the imaging apparatus.

In this configuration, front ends of the protrusions abut on the side surface of the imaging apparatus, and relative positions between the imaging apparatus and the attachment unit in the intersection direction are fixed. Positions of the front ends of the protrusions are appropriately set, and thus positions of the imaging apparatus and the attachment unit can be set. In this case, since positions of the front ends are preferably set, positions in the intersection direction can be more appropriately set.

In the spectrometry system according to the aspect of the invention, the attachment unit preferably includes a positioning portion that changes a position of the spectroscopic unit between an arrangement position where the spectroscopic unit is disposed on the optical path of the imaging element and a retraction position where the spectroscopic unit is retracted from the optical path.

According to the aspect of the invention with this configuration, the attachment unit changes a position of the positioning portion between the arrangement position and the retraction position.

In this configuration, when a spectral measurement is performed, the positioning portion can be moved to the arrangement position, and when a normal image is captured without performing the spectral measurement, the positioning portion can be moved to the retraction position. For this reason, even if the spectroscopic module is not detached, a normal image can be captured. Therefore, it is possible to improve convenience in both a case where a spectroscopic image is captured and a case where a normal image is captured.

In the spectrometry system according to the aspect of the invention, the attachment unit preferably includes a base at which the spectroscopic unit is provided, and that is disposed along a surface of the imaging apparatus on a light incidence side; and a pinch portion that is provided at the base, and pinches the imaging apparatus from a direction intersecting an optical axis of the incident light during the attachment.

According to the aspect of the invention with this configuration, the pinch portion pinches the imaging apparatus, and thus the spectroscopic module is attached to the imaging apparatus. In this configuration, with the simple operation in which the pinch portion pinches the imaging apparatus, the spectroscopic module can be attached to the imaging apparatus. For this reason, it is possible to easily attach and detach the spectroscopic module to and from the imaging apparatus and thus to improve convenience.

In the spectrometry system according to the aspect of the invention, it is preferable that the pinch portion includes a first contact section that comes into contact with one of side surfaces which oppose each other among side surfaces of the imaging apparatus along the optical axis; a second contact section that comes into contact with the other of the side surfaces; and a connection section that connects the contact sections to each other so as to change a distance between the first contact section and the second contact section in the direction intersecting the optical axis, and allows the base to be moved between the contact sections, and the respective contact sections are brought into contact with the imaging apparatus from the direction intersecting the optical axis so as to pinch the imaging apparatus during the attachment.

According to the aspect of the invention with this configuration, the pair of contact sections are connected to each other via the connection section so that a distance in the pinch direction can be changed. The base is configured to be movable along the connection section.

In this configuration, the spectroscopic module can be attached to the imaging apparatus with a plurality of width dimensions. The base can be moved according to a position of the imaging element of the imaging apparatus, and thus a position of the wavelength variable interference filter can be set on the optical axis of the imaging element. Therefore, the spectroscopic module can also be attached to a plurality of imaging apparatuses having different width dimensions or different positions of the imaging element, and thus it is possible to provide the spectroscopic module and the spectrometry system having high versatility.

When a spectral measurement is performed, the base can be moved to the arrangement position on an optical path of incident light, and when a normal image is captured without performing the spectral measurement, the base can be moved to the retraction position so as to be retracted from the optical path. For this reason, even if the spectroscopic module is not detached, a normal image can be captured. Therefore, it is possible to improve convenience in both a case where a spectroscopic image is captured and a case where a normal image is captured.

In the spectrometry system according to the aspect of the invention, it is preferable that the spectroscopic module further includes a reference plate; and a movement mechanism that moves the reference plate between an arrangement position where the reference plate is disposed on an optical path of incident light to the imaging apparatus and a retraction position where the reference plate is retracted from the arrangement position.

In the aspect of the invention with this configuration, the spectroscopic module includes the reference plate, and the movement mechanism that moves the reference plate between the arrangement position and the retraction position.

In this configuration, when the reference plate is imaged in order to acquire a reference, the reference plate can be appropriately disposed at a predetermined position (arrangement position) with respect to the imaging apparatus. Consequently, it is possible to appropriately acquire a reference and thus to improve accuracy of a spectral measurement. Particularly, in the aspect of the invention in which the spectroscopic module is attached to any imaging apparatus, and thus the spectrometry system is configured, it is possible to more appropriately perform calibration of the spectrometry system according to color data of the imaging apparatus or specifications of the imaging apparatus such as performance of an imaging unit.

In the spectrometry system according to the aspect of the invention, it is preferable that the spectroscopic module further includes a plurality of spectroscopic units that select the plurality of predetermined different wavelengths; a changing unit that changes the spectroscopic unit which is disposed on an optical path of incident light to the imaging apparatus; and a positioning unit that holds the spectroscopic unit, and positions the spectroscopic unit with respect to an optical axis of the incident light during the attachment, and the positioning portion is provided in each of the plurality of spectroscopic units.

According to the aspect of the invention with this configuration, the changing unit changes the spectroscopic units disposed on the optical path. The positioning portion is provided in each of the plurality of spectroscopic units.

In this configuration, a plurality of spectroscopic units having different characteristics are disposed, and a spectroscopic unit which is to be used can be selected as necessary. For example, in a case where the spectroscopic units respectively have a near-infrared region, a visible-light region, an ultraviolet region, and the like, it is possible to acquire spectroscopic images in a wide bandwidth. Consequently, it is possible to extend a wavelength range which can be measured in the spectrometry system.

Also in a case where the spectroscopic unit is changed, the above-described positioning is performed every time, and thus it is possible to minimize a reduction in measurement accuracy due to a change of the spectroscopic unit.

In the spectrometry system according to the aspect of the invention, it is preferable that the spectroscopic unit is a Fabry-Perot etalon.

According to the aspect of the invention with this configuration, a Fabry-Perot etalon is used as the spectroscopic unit.

Consequently, a dimension between the pair of reflective surfaces is sequentially changed, and therefore it is possible to extract light beams with a plurality of wavelengths and thus to reduce time required for a measurement. The Fabry-Perot etalon can be miniaturized and thus allows the spectrometry system to be miniaturized when compared with a case of using, for example, an acousto-optic tunable filter (AOTF) or a liquid crystal tunable filter (LCTF).

It is preferable that the spectrometry system according to the aspect of the invention further includes a positional deviation detection unit that detects a positional deviation of the spectroscopic unit relative to the imaging apparatus.

According to the aspect of the invention with this configuration, the positional deviation detecting unit is provided which detects a positional deviation of the spectroscopic unit, and detects a positional deviation when the spectroscopic module is attached to the imaging apparatus. Consequently, it is possible to prevent a spectral measurement from being performed in a state in which a positional deviation occurs.

In the spectrometry system according to the aspect of the invention, it is preferable that the positional deviation detection unit detects the positional deviation by detecting part of the spectroscopic module in a captured image on the basis of the captured image which is captured by the imaging apparatus.

According to the aspect of the invention with this configuration, in a case where part of the spectroscopic module is reflected in a captured image, the positional deviation detecting unit detects the part of the spectroscopic module. Consequently, it is possible to detect a positional deviation of the spectroscopic unit in the direction intersecting the optical axis of incident light to the imaging apparatus.

It is preferable that the spectrometry system according to the aspect of the invention further includes a region specifying unit that specifies an image region corresponding to light incident to the spectroscopic unit in a predetermined angle range in a captured image which is captured by the imaging apparatus; and an analysis processing unit that performs an analysis process on the image region.

Here, the predetermined angle range is an angle range which allows analysis accuracy to be included in an allowable range in a case where an analysis process is performed by using an image region of a captured image corresponding to light incident to the spectroscopic unit.

According to the aspect of the invention with this configuration, an image region corresponding to light incident to the spectroscopic unit in a predetermined angle range is specified in a captured image, and an analysis process is performed on the image region. If light is incident to the spectroscopic unit at an angle exceeding the predetermined angle range, there are cases where an error may occur in which light emitted from the spectroscopic unit does not have a desired wavelength. For example, in a Fabry-Perot etalon which can be used as the spectroscopic unit, the fact is known that a wavelength of emitted light changes depending on an incidence angle of incident light. For this reason, if an analysis process is preformed on a region including an image region of incident light which is incident at an angle range at which an error of a wavelength of emitted light relative to a set wavelength exceeds an allowable value, there is a concern that desired analysis accuracy may not be maintained.

In the aspect of the invention, an analysis process target can be set to an image region of light which is incident in the predetermined angle range. For this reason, it is possible to minimize a reduction in analysis accuracy.

It is preferable that the spectrometry system according to the aspect of the invention further includes a display unit that displays an image; and a display control unit that displays the captured image acquired by the imaging apparatus on the display unit, and the display control unit causes a range of an analysis region which is a target of the analysis process and is included in at least the image region, to overlap the captured image and to be displayed.

According to the aspect of the invention with this configuration, a range of an analysis region which is an analysis process target overlaps a captured image so as to be displayed on the display unit. For this reason, it is possible to adjust an imaging direction of the imaging apparatus while referring to an image displayed on the display unit and thus to easily adjust the imaging direction so that a measurement target is included in an analysis region.

Another aspect of the invention is directed to a spectroscopic module including a spectroscopic unit that selectively emits light with a predetermined wavelength from incident light and can change a wavelength of the emitted light; and an attachment unit that holds the spectroscopic unit, is provided to be attachable to and detachable from the imaging apparatus including an imaging element which captures an image, and can dispose the spectroscopic unit on an optical path of incident light to the imaging apparatus during attachment to the imaging apparatus.

In the spectroscopic module according to the aspect of the invention, the spectroscopic module is configured to be attachable to and detachable from the imaging apparatus.

In this configuration, the spectroscopic module and the imaging apparatus can be formed as separate bodies. As the imaging apparatus, an apparatus such as a digital camera or a smart phone which is generally wide spread and has an imaging function may be used. Therefore, it is possible to provide the spectroscopic module used to constitute a spectrometry system with high versatility.

Still another aspect of the invention is directed to a positional deviation detection method performed in a spectrometry system including an imaging apparatus and a spectroscopic module, the method including causing the imaging apparatus to capture an image and to acquire a captured image; and detecting a positional deviation by detecting part of the spectroscopic module in the captured image, in which the imaging apparatus includes an imaging element which captures an image, in which the spectroscopic module includes a spectroscopic unit which selectively emits light with a predetermined wavelength from incident light and can change a wavelength of the emitted light; and an attachment unit which holds the spectroscopic unit, is provided to be attachable to and detachable from the imaging apparatus, and can dispose the spectroscopic unit on an optical path of incident light to the imaging apparatus during attachment to the imaging apparatus, and in which a control unit which controls the imaging apparatus and the spectroscopic module is provided in at least one of the imaging apparatus and the spectroscopic module.

According to the aspect of the invention, in a case where part of the spectroscopic module is reflected in a captured image, the spectrometry system detects the part of the spectroscopic module. Consequently, it is possible to detect a positional deviation of the spectroscopic unit in the direction intersecting the optical axis of incident light to the imaging apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.
Configuration of Spectrometry System FIG. 1 is a block diagram schematically illustrating a schematic configuration of a spectrometry system according to an embodiment of the invention.

Figure 2:
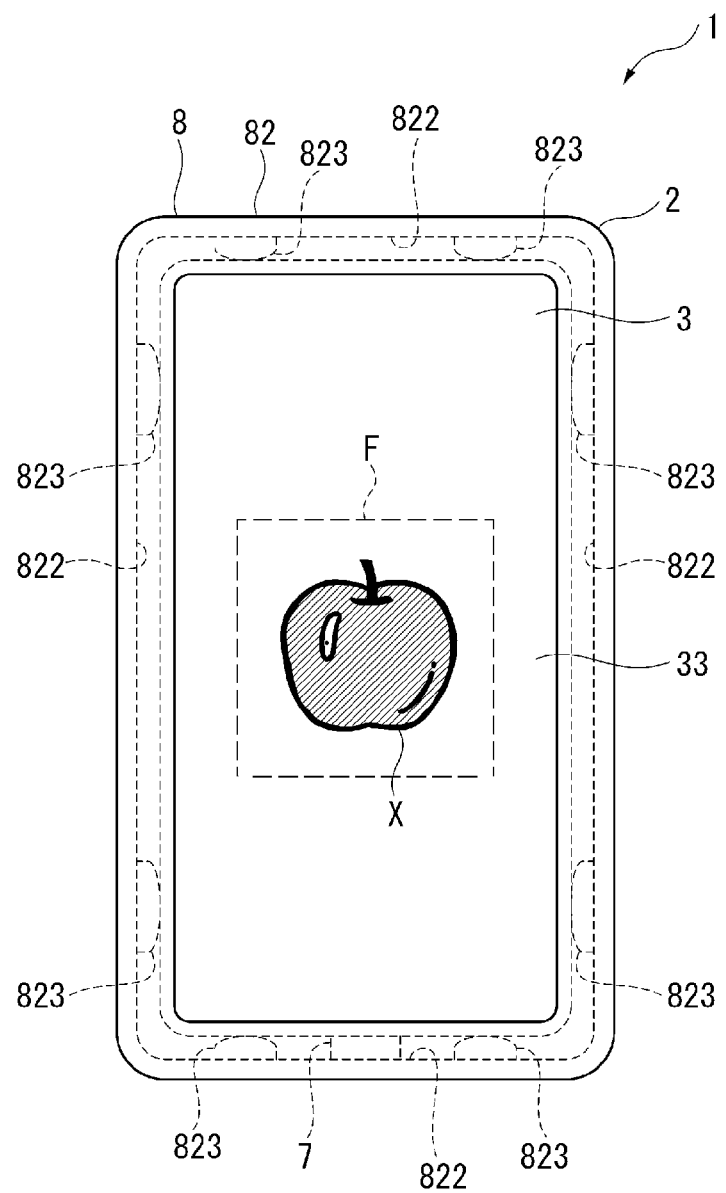
FIG. 2 is a front view schematically illustrating the spectrometry system of the embodiment.
Figure 3:
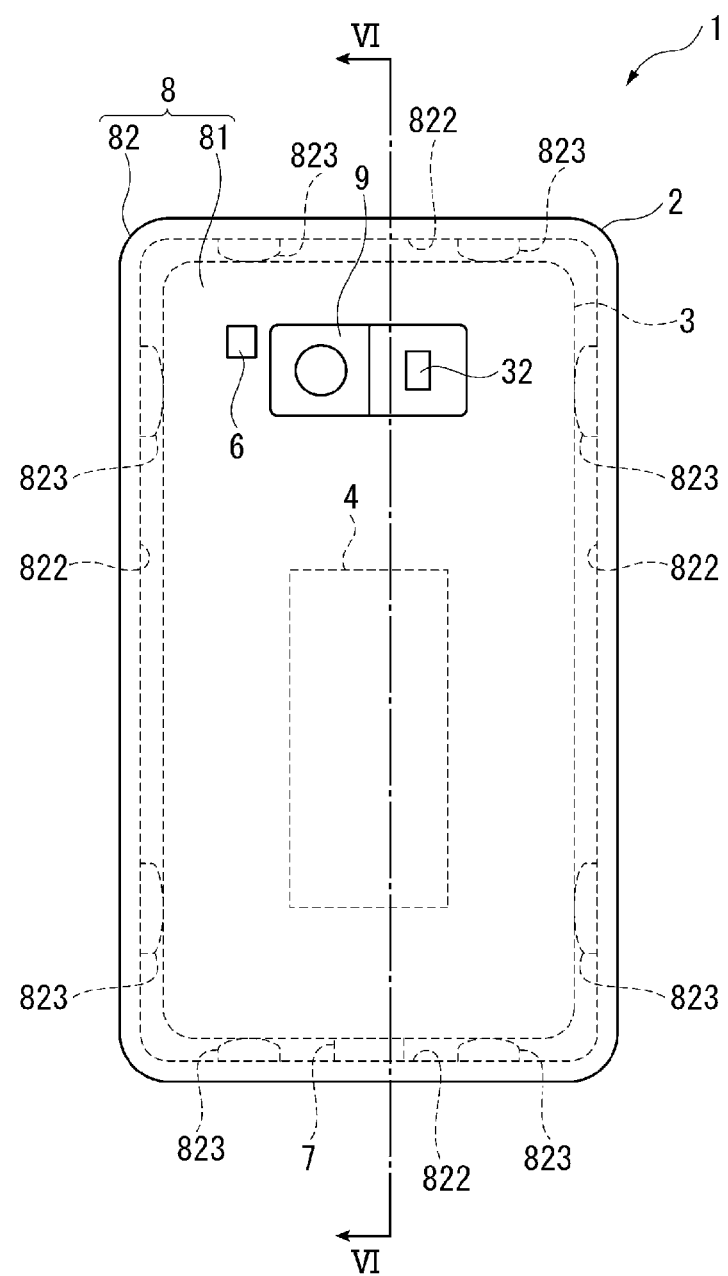
FIG. 3 is a rear view schematically illustrating the spectrometry system of the embodiment.

FIG. 2 is a front view illustrating a schematic configuration of the spectrometry system. FIG. 3 is a rear view illustrating a schematic configuration of the spectrometry system.

Figure 1:
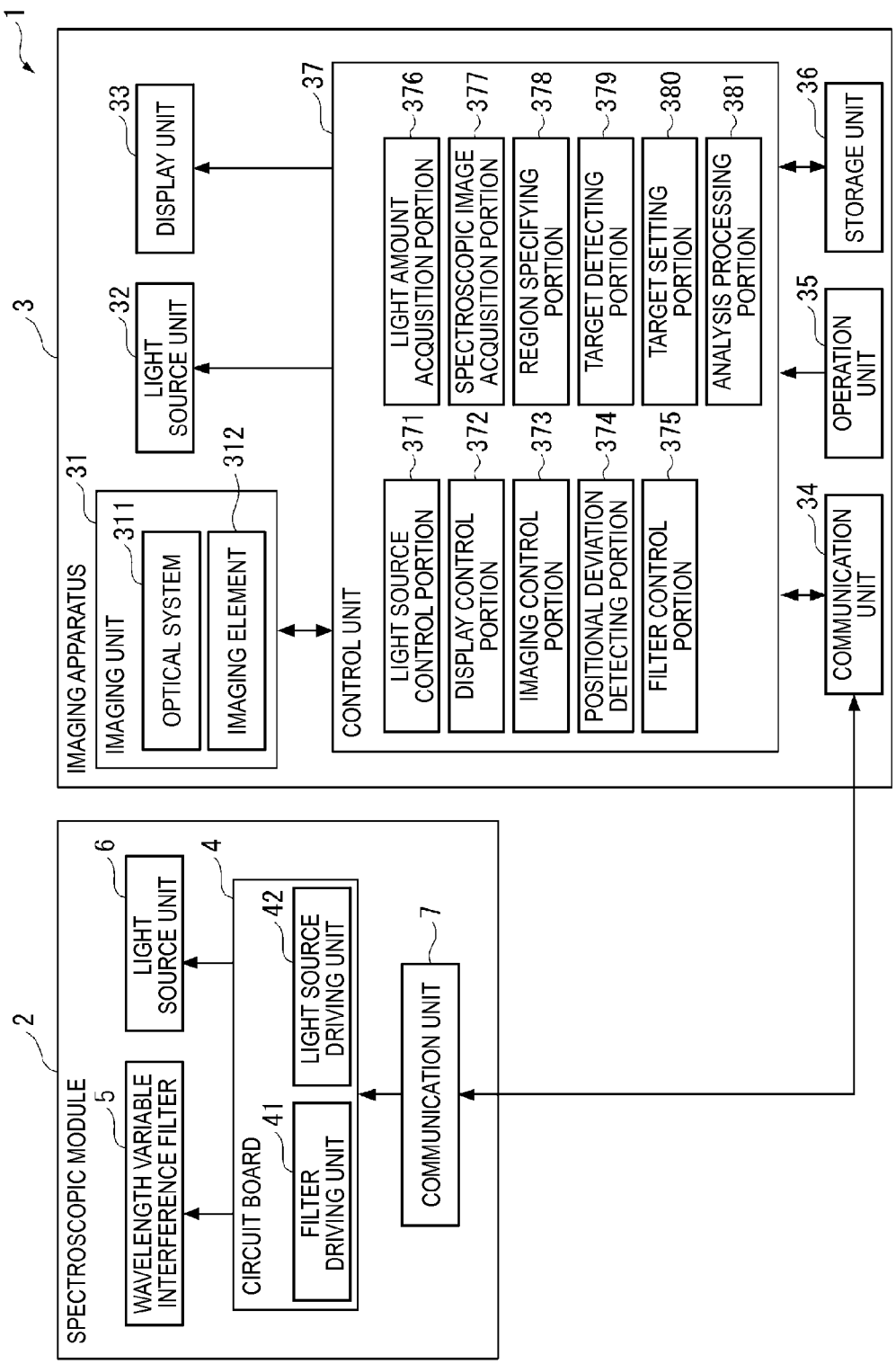
FIG. 1 is a block diagram illustrating a schematic configuration of a spectrometry system according to a first embodiment.

A spectrometry system 1 includes a spectroscopic module 2 and an imaging apparatus 3 as illustrated in FIG. 1. The spectroscopic module 2 is attachably and detachably attached to the imaging apparatus 3. In the present embodiment, as the imaging apparatus 3, a smart phone which is one of a portable terminal apparatus having an imaging function is exemplified. An imaging apparatus to which the invention is applicable is not limited to a smart phone, and various apparatuses having an imaging function, such as a digital camera or a tablet personal computer (PC) may be used.

The spectrometry system 1 is used in a state in which the spectroscopic module 2 is attached to the imaging apparatus 3 as illustrated in FIGS. 2 and 3. In other words, the spectrometry system 1 acquires a spectroscopic image by the imaging apparatus 3 imaging light with a wavelength which is selected by the spectroscopic module 2 from light reflected at an imaging target X (refer to FIG. 2). The spectrometry system 1 is a system which performs, for example, an analysis process such as component analysis on the basis of the spectroscopic image. The present embodiment shows an example of measuring light reflected at the imaging target X, but, for example, in a case where a light emitting body such as a liquid crystal panel is used as the imaging target X, light emitted from the light emitting body may be used as measurement target light.
Configuration of Spectroscopic Module As illustrated in any one of FIGS. 1, 2 and 3, the spectroscopic module 2 includes a circuit board 4, a wavelength variable interference filter 5, a light source unit 6, a communication unit 7, and an attachment unit 8.

The wavelength variable interference filter 5 is a wavelength variable type Fabry-Perot etalon.

The attachment unit 8 holds the circuit board 4, the wavelength variable interference filter 5, the light source unit 6, and the communication unit 7, and is attached to the spectroscopic module 2.

When the spectroscopic module 2 is attached to the imaging apparatus 3 (hereinafter, simply referred to as "during attachment"), the wavelength variable interference filter 5 is disposed on an optical path of incident light which is incident to an imaging unit 31 described later of the imaging apparatus 3. The spectroscopic module 2 causes light with a predetermined wavelength which is transmitted through the wavelength variable interference filter 5 to be incident to the imaging unit 31. The spectroscopic module 2 is configured to be able to communicate with the imaging apparatus 3, and the wavelength variable interference filter 5 is controlled on the basis of a control signal from the imaging apparatus 3. Hereinafter, a configuration of each unit of the spectroscopic module 2 will be described.

Configuration of Wavelength Variable Interference Filter

Figure 4:
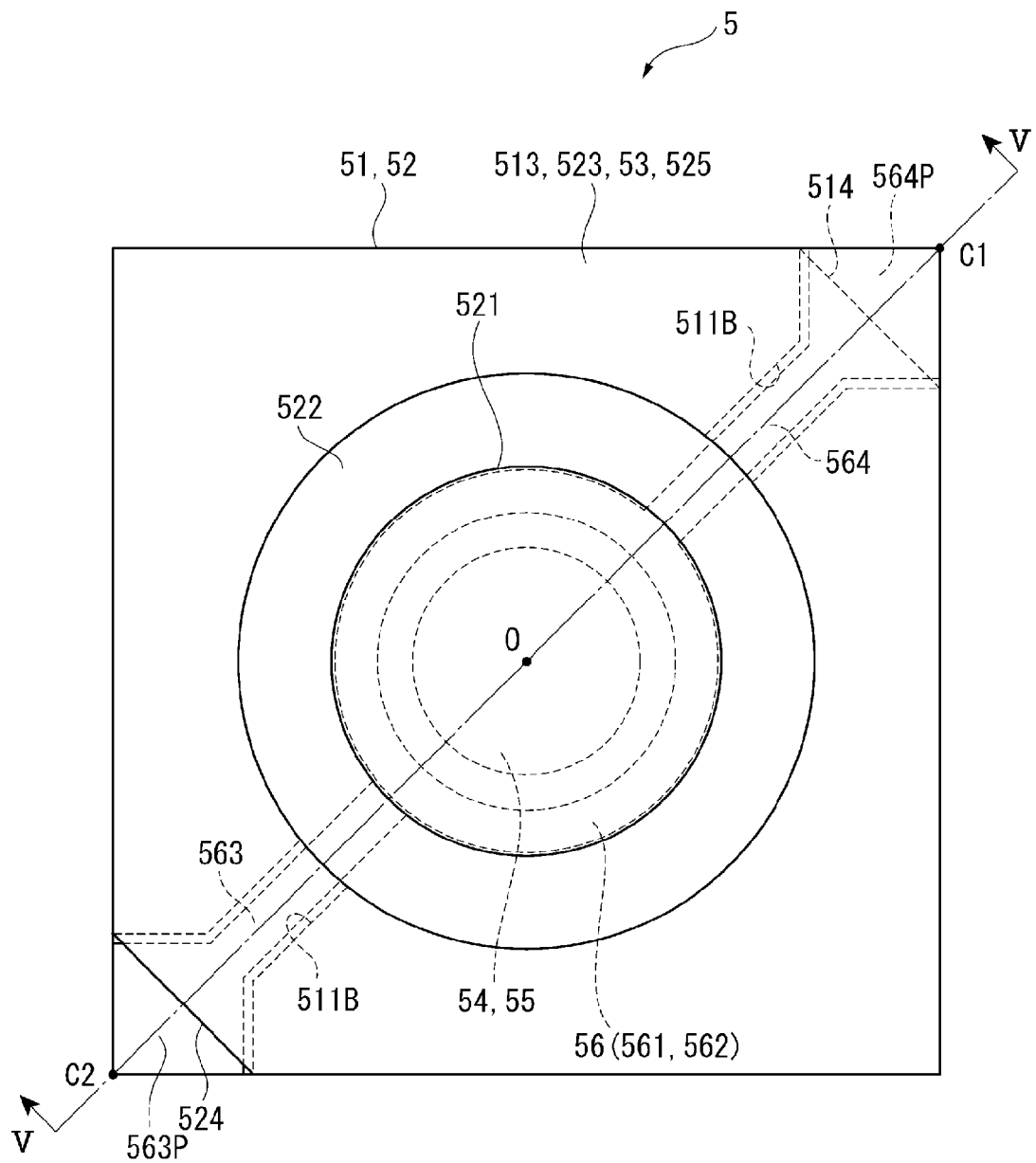
FIG. 4 is a plan view illustrating a schematic configuration of a wavelength variable interference filter of the embodiment.
Figure 5:
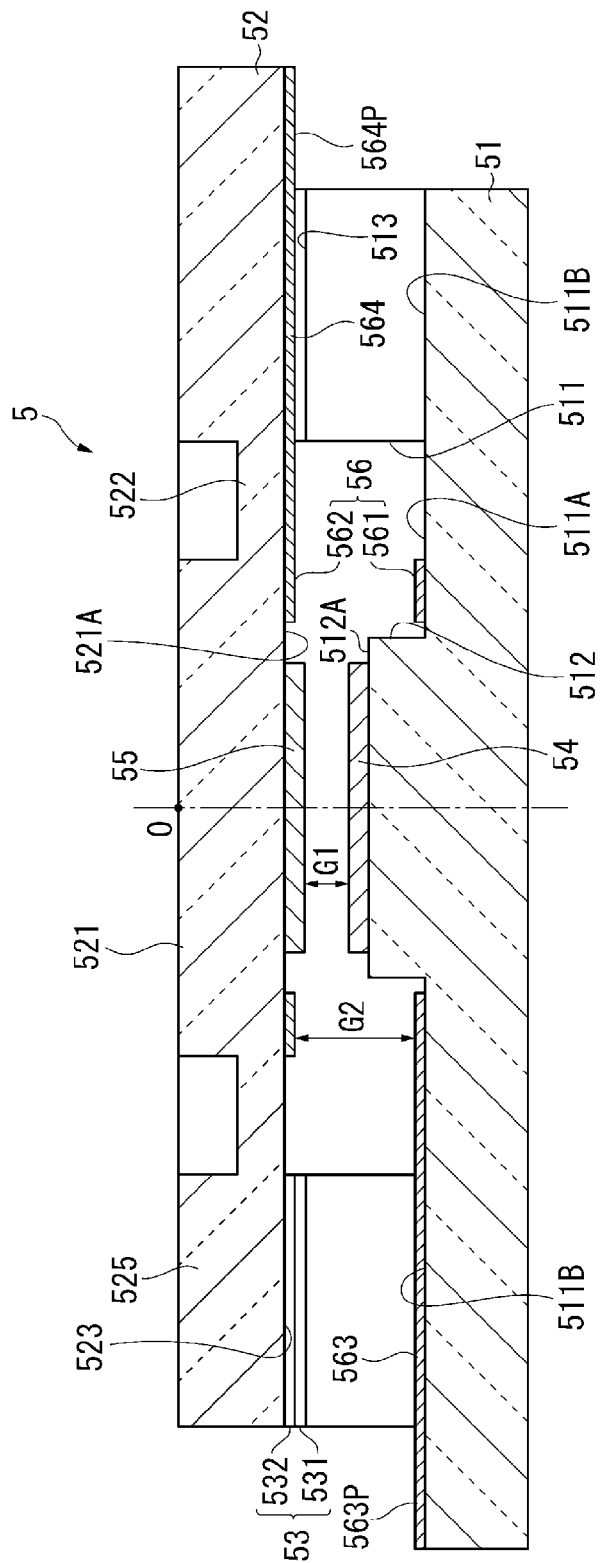
FIG. 5 is a cross-sectional view illustrating a schematic configuration of the wavelength variable interference filter of the embodiment.

FIG. 4 is a plan view illustrating a schematic configuration of the wavelength variable interference filter. FIG. 5 is a cross-sectional view of the wavelength variable interference filter taken along the line V-V of FIG. 4.

The wavelength variable interference filter 5 is, for example, a rectangular plate-shaped optical member, and includes a fixed substrate 51 and a movable substrate 52. Each of the fixed substrate 51 and the movable substrate 52 is made of, for example, various kinds of glass such as soda glass, crystalline glass, quartz glass, lead glass, potassium glass, borosilicate glass, alkali-free glass, quartz crystal, or the like. In addition, the fixed substrate 51 and the movable substrate 52 are joined to each other via a joining film 53 (a first joining film 531 and a second joining film 532) and are thus integrally formed as illustrated in FIG. 3. Specifically, a first joining portion 513 of the fixed substrate 51 and a second joining portion 523 of the movable substrate 52 are joined to each other via the joining film 53 which is formed of, for example, a plasma polymerization film or the like having siloxane as a main component.

A fixed reflective film 54 is provided on the fixed substrate 51, and a movable reflective film 55 is provided on the movable substrate 52. The fixed reflective film 54 and the movable reflective film 55 are disposed so as to face each other with a gap G1. The wavelength variable interference filter 5 is provided with an electrostatic actuator 56 which is used to adjust (change) a dimension of the gap G1.

In a plan view (hereinafter, referred to as a filter plan view), as illustrated in FIG. 4, in which the wavelength variable interference filter 5 is viewed from a substrate thickness direction of the fixed substrate 51 (or the movable substrate 52), it is assumed that a plane central point O of the fixed substrate 51 and the movable substrate 52 matches a central point of the fixed reflective film. 54 and the movable reflective film 55, and matches a central point of a movable portion 521 described later.

Configuration of Fixed Substrate

The fixed substrate 51 is provided with an electrode arrangement groove 511 and a reflective film installation portion 512 which are formed through etching. The fixed substrate 51 is formed in a larger thickness dimension than that of the movable substrate 52, and thus there is no deflection of the fixed substrate 51 due to an electrostatic attraction caused by application of a voltage between the fixed electrode 561 and the movable electrode 562 or an internal stress of the fixed electrode 561.

A notch 514 is formed at a vertex C1 of the fixed substrate 51, and thus a movable electrode pad 564P is exposed to the fixed substrate 51 side of the wavelength variable interference filter 5.

The electrode arrangement groove 511 is formed in a ring shape centering on the plane central point O of the wavelength variable interference filter 5 in the filter plan view. The reflective film installation portion 512 is formed to protrude toward the movable substrate 52 side from the central part of the electrode arrangement groove 511 in the filter plan view as illustrated in FIG. 3. A groove bottom surface of the electrode arrangement groove 511 is an electrode installation surface 511A on which the fixed electrode 561 is disposed. In addition, a protruding front end surface of the reflective film installation portion 512 is a reflective film installation surface 512A.

The fixed substrate 51 is provided with an electrode extraction groove 511B which extends from the electrode arrangement groove 511 toward the vertexes C1 and C2 of the outer circumferential edges of the fixed substrate 51.

The fixed electrode 561 forming the electrostatic actuator 56 is provided on the electrode installation surface 511A of the electrode arrangement groove 511. More specifically, the fixed electrode 561 is provided in a region facing the movable electrode 562 of the movable portion 521 described later on the electrode installation surface 511A. An insulating layer for ensuring insulation between the fixed electrode 561 and the movable electrode 562 may be laminated on the fixed electrode 561.

The fixed substrate 51 is provided with a fixed extraction electrode 563 which extends from the outer circumferential edge of the fixed electrode 561 toward the vertex C2. An extending front end (a part located at the vertex C2 of the fixed substrate 51) of the fixed extraction electrode 563 forms a fixed electrode pad 563P.

In the present embodiment, a configuration in which a single fixed electrode 561 is provided on the electrode installation surface 511A is described, but, for example, a configuration (double electrode configuration) or the like in which two electrodes forming concentric circles centering on the plane central point O are provided may be employed.

As described above, the reflective film installation portion 512 is formed in a substantially columnar shape having a smaller diameter dimension than that of the electrode arrangement groove 511 on the same axis as the electrode arrangement groove 511, and the reflective film installation portion 512 is provided with the reflective film installation surface 512A facing the movable substrate 52.

The reflective film installation portion 512 is provided with the fixed reflective film 54 as illustrated in FIG. 5. As the fixed reflective film 54, for example, a metal film such as Ag, or an alloy film such as an Ag alloy may be used. For example, a dielectric multilayer film which has a high refractive index layer made of $TiO_2$ and a low refractive index layer made of $SiO_2$ may be used. Further, a reflective film in which a metal film (alloy film) is laminated on a dielectric multilayer film, a reflective film in which a dielectric multilayer film is laminated on a metal film (alloy film), a reflective film in which a single refractive layer ($TiO_2$ or $SiO_2$) and a metal film are laminated, or the like may be used.

A light incidence surface (a surface on which the fixed reflective film 54 is not provided) of the fixed substrate 51 may be provided with an antireflective film at a position corresponding to the fixed reflective film 54. This antireflective film may be formed, for example, by alternately laminating a low refractive index film and a high refractive index film, and increases transmittance by reducing reflectance of visible light on the surface of the fixed substrate 51.

A part, in which the electrode arrangement groove 511, the reflective film installation portion 512, and the electrode extraction groove 511B are not formed through etching on the surface the fixed substrate 51 facing the movable substrate 52, forms the first joining portion 513. The first joining film 531 is provided at the first joining portion 513, and the first joining film 531 is joined to the second joining film 532 provided at the movable substrate 52 so that the fixed substrate 51 and the movable substrate 52 are joined together as described above.

Configuration of Movable Substrate

In the filter plan view illustrated in FIG. 4, the movable substrate 52 includes the movable portion 521 which has a circular shape centering on the plane central point O, a holding portion 522 which is located at the same axis as that of the movable portion 521 and holds the movable portion 521, and a substrate outer circumferential portion 525 which is provided outside the holding portion 522.

As illustrated in FIG. 4, a notch 524 is formed at the movable substrate 52 so as to correspond to the vertex C2, and thus the fixed electrode pad 563P is exposed therethrough when the wavelength variable interference filter 5 is viewed from the movable substrate 52 side.

The movable portion 521 is formed in a larger thickness dimension than that of the holding portion 522, and, for example, in the present embodiment, is formed in the same dimension as a thickness dimension of the movable substrate 52. The movable portion 521 is formed in a larger thickness dimension than at least a thickness dimension of the outer circumferential edge of the reflective film installation surface 512A in the filter plan view. In addition, the movable electrode 562 and the movable reflective film 55 are provided at the movable portion 521.

In the same manner as in the fixed substrate 51, an antireflective film may be formed on a surface of the movable portion 521 on an opposite side to the fixed substrate 51. This antireflective film may be formed, for example, by alternately laminating a low refractive index film and a high refractive index film, and increases transmittance by reducing reflectance of visible light on the surface of the movable substrate 52.

The movable electrode 562 faces the fixed electrode 561 with the gap G2 interposed therebetween, and is formed in the same shape as that of the fixed electrode 561. The movable electrode 562 forms the electrostatic actuator 56 along with the fixed electrode 561. The movable substrate 52 is provided with a movable extraction electrode 564 which extends from the outer circumferential edge of the movable electrode 562 toward the vertex C1. An extending front end (a part located at the vertex C1 of the movable substrate 52) of the movable extraction electrode 564 forms the movable electrode pad 564P.

The movable reflective film 55 is provided to face the fixed reflective film 54 with the gap G1 interposed therebetween at the central part of the movable surface 521A of the movable portion 521. A reflective film having the same configuration as that of the above-described fixed reflective film 54 is used as the movable reflective film 55.

In the present embodiment, as described above, an example in which the gap G2 has a larger dimension than that of the gap G1 is shown, but the invention is not limited thereto. For example, as in a case where infrared rays or far infrared rays are used as measurement target light, a dimension of the gap G1 may be larger than a dimension of the gap G2 depending on a wavelength region of measurement target light.

The holding portion 522 is a diaphragm which surrounds the periphery of the movable portion 521, and is formed in a smaller thickness dimension than that of the movable portion 521. The holding portion 522 is more easily deflected than the movable portion 521, and can displace the movable portion 521 to the fixed substrate 51 side with a slight electrostatic attraction. At this time, the movable portion 521 has a larger thickness dimension than that of the holding portion 522, and has an increasing rigidity. For this reason, the shape of the holding portion 522 is not changed even in a case where the movable portion 521 is pulled to the fixed substrate 51 side by an electrostatic attraction. Therefore, there is no occurrence of deflection of the movable reflective film 55 provided at the movable portion 521, and it is possible to maintain the fixed reflective film 54 and the movable reflective film 55 in a parallel state at all times.

In the present embodiment, the holding portion 522 with a diaphragm shape is exemplified, but, the invention is not limited thereto, and, for example, the holding portion may have a beam shape so as to be disposed at the same angle intervals centering on the plane central point O.

The substrate outer circumferential portion 525 is provided outside the holding portion 522 in the filter plan view as described above. A surface of the substrate outer circumferential portion 525 facing the fixed substrate 51 is provided with the second joining portion 523 facing the first joining portion 513. In addition, the second joining film 532 is provided at the second joining portion 523, and, as described above, the second joining film 532 is joined to the first joining film. 531 so that the fixed substrate 51 and the movable substrate 52 are joined to each other.

Configurations of Light Source Unit and Communication Unit

The light source unit 6 irradiates the imaging target X with illumination light. As illustrated in FIG. 3, the light source unit 6 is provided around a positioning portion 9 described later which holds the wavelength variable interference filter 5 on a rear side (a rear surface portion 81 described later) of the attachment unit 8. The light source unit 6 is constituted by a light source such as a halogen lamp or an LED light source. The light source unit 6 is a white light source, or a light source which can apply light with a predetermined wavelength, such as infrared rays, and is constituted by a light source such as a halogen lamp or an LED light source. In a case where the light source unit 6 can apply light with an infrared wavelength region, it is possible to perform a spectral measurement of an infrared wavelength region even if the imaging apparatus 3 is not provided with a light source which applies light with an infrared wavelength region.

The communication unit 7 performs communication with the imaging apparatus 3, for example, so as to receive a command signal from a control unit 37 or to transmit various signals from the spectroscopic module to the control unit 37. As illustrated in FIG. 1, the communication unit 7 performs communication with a communication unit 34 described later of the imaging apparatus 3 through wired communication.

The communication unit 7 is not limited to a configuration of performing wired communication with the imaging apparatus 3, and may employ a configuration of performing communication with imaging apparatus 3 through various types of wireless communication such as Wi-Fi (registered trademark), Bluetooth (registered trademark), or infrared communication. A configuration may be employed in which communication is performed with the imaging apparatus 3 via a LAN or the Internet through wired communication or wireless communication.

Configuration of Circuit Board

The circuit board 4 is provided inside the attachment unit 8, and is provided with a filter driving unit 41 and a light source driving unit 42. The circuit board 4 is provided with various circuits, and specific hardware as exemplified as a CPU, a ROM, a RAM, and the like. In other words, the circuit board 4 corresponds to a controller which causes the hardware to function as the filter driving unit 41 and the light source driving unit 42.

The filter driving unit 41 is a driving circuit which applies a driving voltage to the wavelength variable interference filter 5. The filter driving unit 41 applies a driving voltage to the electrostatic actuator 56 of the wavelength variable interference filter 5 on the basis of a control signal from the control unit 37 described later of the imaging apparatus 3.

Consequently, an electrostatic attraction is generated between the fixed electrode 561 and the movable electrode 562 of the electrostatic actuator 56, and thus the movable portion 521 is displaced toward the fixed substrate 51 side.

The light source driving unit 42 applies a driving voltage to the light source unit 6 on the basis of a control signal from the control unit 37 described later of the imaging apparatus 3.

Configuration of Attachment Unit

The attachment unit 8 is attachably and detachably attached to the imaging apparatus 3. The attachment unit 8 is provided with the positioning portion 9 which positions the wavelength variable interference filter 5 with respect to the imaging apparatus 3.

Figure 6:
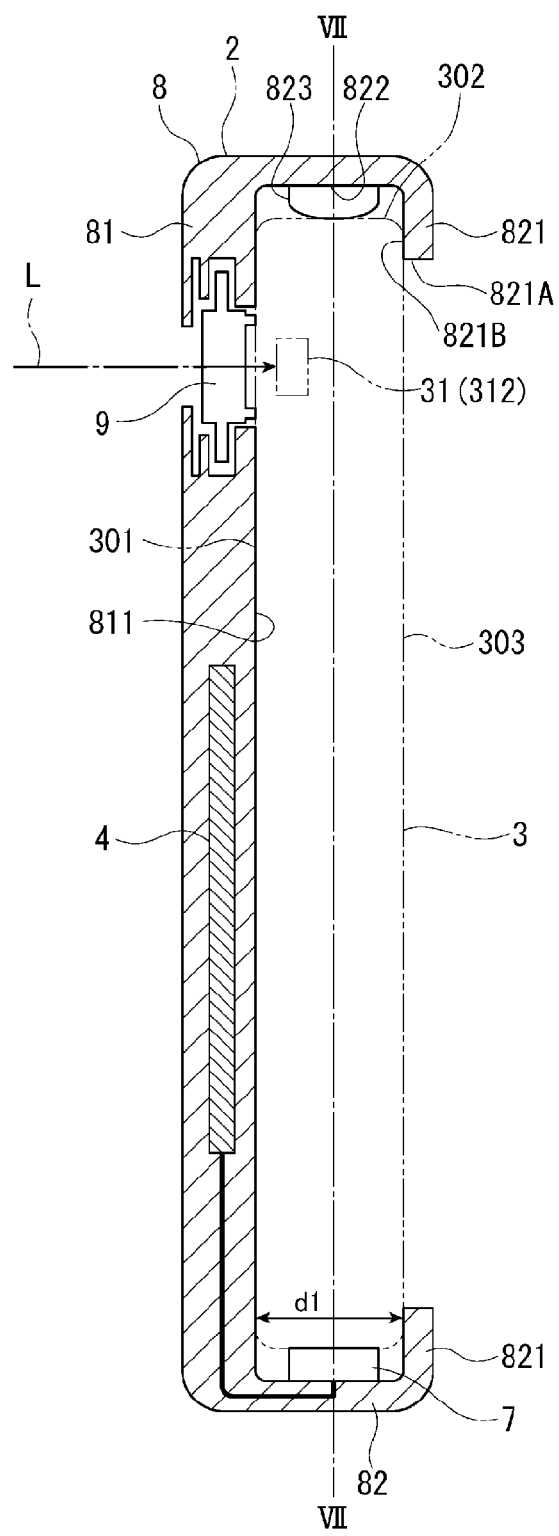
FIG. 6 is a cross-sectional view schematically illustrating the spectrometry system of the embodiment.

FIG. 6 is a cross-sectional view schematically illustrating a cross section of the spectrometry system 1 in the line VI-VI of FIG. 3.

As illustrated in FIG. 6, the attachment unit 8 includes a rear surface portion 81 which is disposed along a rear surface 301 which is a surface on a light incidence side on which the imaging unit 31 of the imaging apparatus 3 is provided, during attachment, and a sidewall 82 which is connected to a periphery of the rear surface portion 81 and covers a side surface 302 of the imaging apparatus 3 along an optical axis L of incident light of the imaging unit 31 during attachment.

The rear surface portion 81, which corresponds to abase according to the invention, is substantially rectangular when viewed from the optical axis L direction, and is larger than the rear surface 301 of the imaging apparatus 3 which is similarly substantially rectangular. The rear surface portion 81 holds the circuit board 4 therein. As described later in detail, the rear surface portion 81 stores the positioning portion 9 at a position along the optical axis L. An inner surface 811 which is a surface of the rear surface portion 81 on the imaging apparatus 3 side substantially matches a shape of the rear surface 301 of the imaging apparatus 3. In the present embodiment, the inner surface 811 is planar, but, for example, in a case where the rear surface 301 of the imaging apparatus 3 is curved or the like, the inner surface may be curved according to the rear surface 301. The substantially rectangular periphery of the rear surface portion 81 is connected to the sidewall 82 along aside surface 302 of the imaging apparatus 3.

The sidewall 82 surrounds the periphery of the imaging apparatus 3 along the side surface 302 of the imaging apparatus 3. A hook portion 821 which is curved inward in a direction (hereinafter, simply referred to as an intersection direction) intersecting the optical axis L direction is provided at an end of the sidewall 82 on an opposite side to the rear surface portion 81 in the optical axis L direction. In the hook portion 821, an opening 821A which has a dimension smaller than that of an outer circumference of a front surface 303 which opposes the rear surface 301 of the imaging apparatus 3 when viewed from the optical axis L direction. In other words, the hook portion 821 covers the outer circumference of the front surface 303. The hook portion 821 opposes the rear surface portion 81 in the optical axis L direction. In other words, an inner surface 821B of the hook portion 821 intersecting the optical axis L and the inner surface 811 of the rear surface portion 81 oppose each other. A distance d1 between the inner surface 811 of the rear surface portion 81 and an inner surface 821B of the hook portion 821 is substantially the same as a dimension of the imaging apparatus 3 in the optical axis L direction.

In other words, the imaging apparatus 3 is pinched between the rear surface portion 81 and the hook portion 821 in the thickness direction so as to be fixed.

Figure 7:
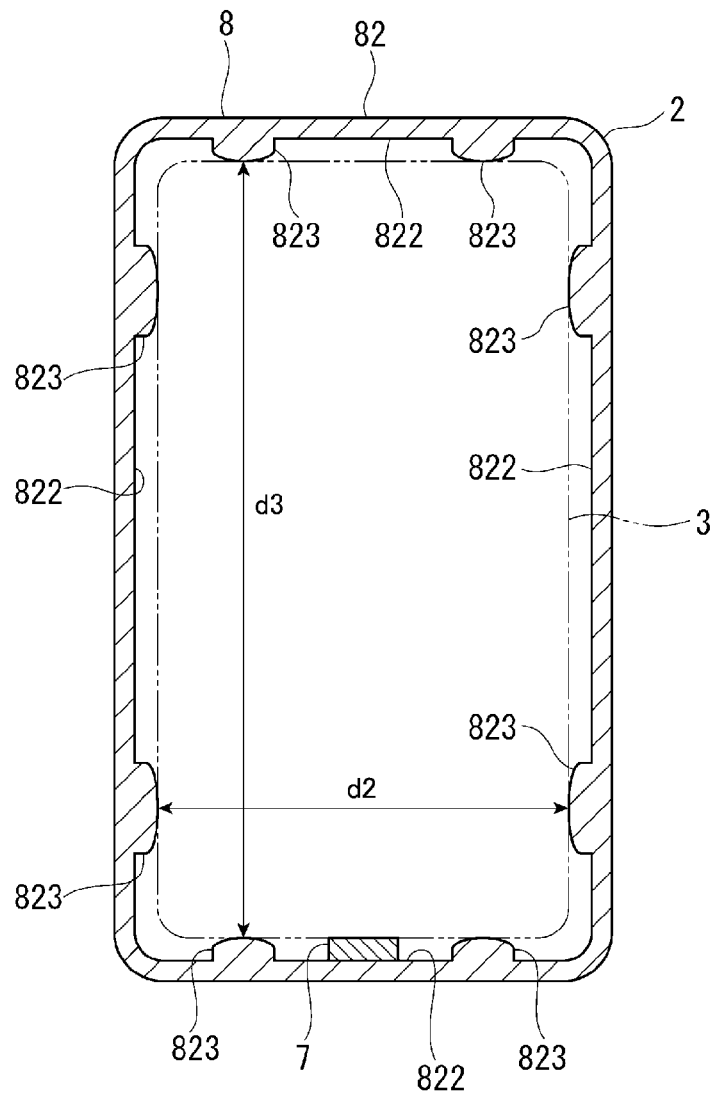
FIG. 7 is a cross-sectional view schematically illustrating the spectrometry system of the embodiment.

FIG. 7 is a cross-sectional view schematically illustrating a cross section of the spectrometry system 1 in the line VII-VII of FIG. 6.

As illustrated in FIG. 7, a plurality of protrusions 823 are provided on an inner surface 822 of the sidewall 82. In the present embodiment, two protrusions 823 are provided to oppose each other in a direction perpendicular to the inner surface 811. In addition, two protrusions 823 are provided with respect to each side surface 302 of the imaging apparatus 3. In other words, four sets of protrusions 823 which oppose each other in the direction perpendicular to the inner surface 811 are provided to cover the periphery of the imaging apparatus 3. As illustrated in FIG. 7, distances d2 and d3 between the opposing protrusions 823 are respectively substantially the same as the dimensions of the imaging apparatus 3 in the opposing directions.

In other words, the imaging apparatus 3 is pinched and fixed by the four sets of protrusions 823 in surface directions intersecting the optical axis L.

The communication unit 7 is provided on the sidewall 82 and is connected to a communication unit 34 described later of the imaging apparatus 3.

Figure 8:
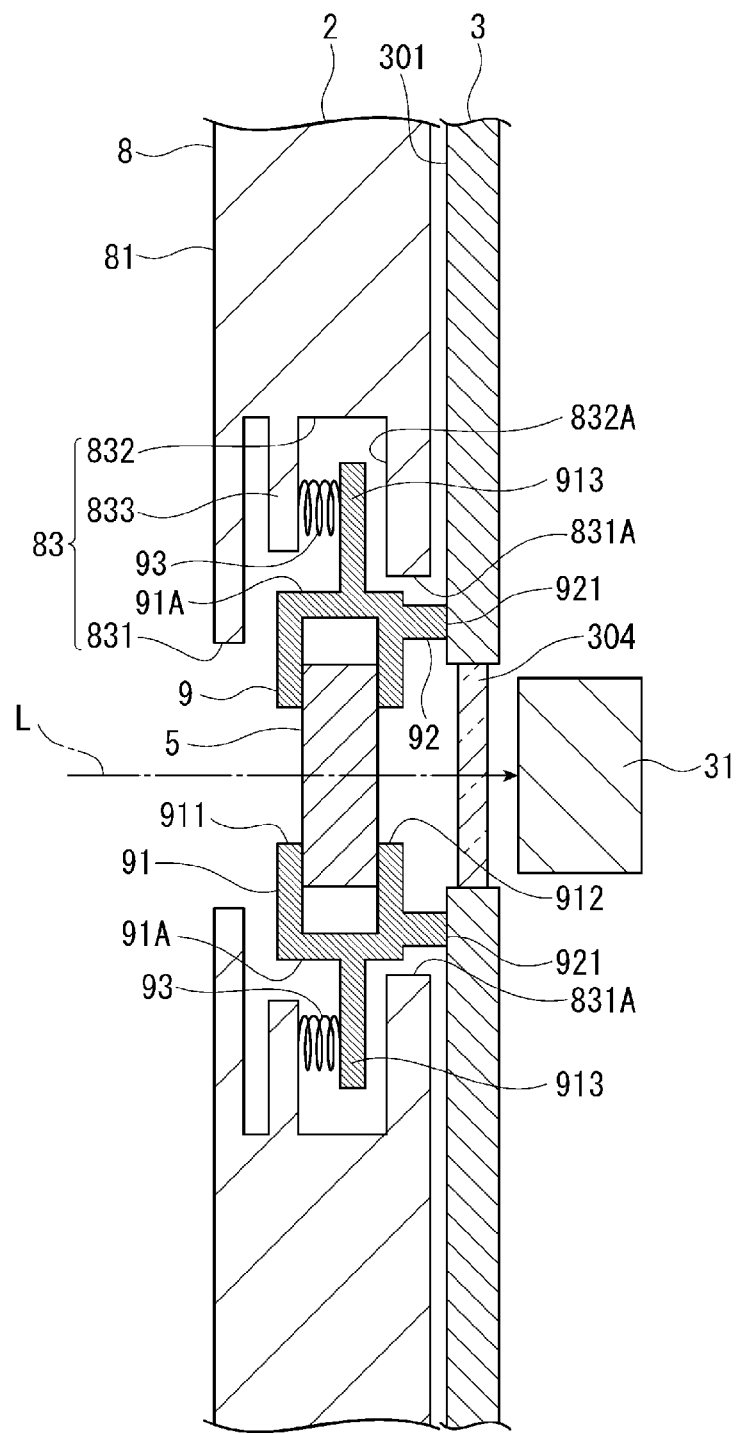
FIG. 8 is a cross-sectional view schematically illustrating a periphery of a positioning portion of the embodiment.

FIG. 8 is a cross-sectional view illustrating a schematic configuration of a cross section around the positioning portion 9 in the spectrometry system 1.

As illustrated in FIG. 8, the rear surface portion 81 has a storage section 83 which stores a casing 91 described later of the positioning portion 9 at a position where the optical axis L passes.

The storage section 83 includes a through hole 831 which penetrates in the optical axis L direction at the position where the optical axis L passes, a groove 832 which is provided at the through hole 831 in the intersection direction, and a protrusion 833 which protrudes from the groove 832 in the intersection direction. The through hole 831 is open at both ends in the optical axis L direction, and stores the casing 91 therein. A flange 913 described later which protrudes from the casing 91 in the intersection direction is inserted into the groove 832. A biasing section 93 described later of the positioning portion 9 is disposed between the protrusion 833 and the flange 913.

Configuration of Positioning Portion

As illustrated in FIG. 8, the positioning portion 9 is stored at the position where the optical axis L passes inside the rear surface portion 81 in a state of holding the wavelength variable interference filter 5.

The positioning portion 9 includes the casing 91 which holds the wavelength variable interference filter 5, an abutting section 92 which abuts on the rear surface 301 of the imaging apparatus 3 and positions the wavelength variable interference filter 5 with respect to the optical axis L during attachment, and the biasing section 93 which biases the casing 91 toward the imaging apparatus 3 side during attachment.

The casing 91 corresponds to a spectroscopic holding section according to the invention, and holds the wavelength variable interference filter 5 in a state of storing the wavelength variable interference filter 5 therein. An opening 911 is formed in a surface of the casing 91 on the light incidence side in the optical axis L direction, and an opening 912 is formed in a surface on an opposite side. Light incident to the imaging apparatus 3 passes through the opening 911 of the casing 91 disposed inside the through hole 831 and is then incident to the wavelength variable interference filter 5.

Light emitted from the wavelength variable interference filter 5 passes through the opening 912 and is then incident to the imaging unit 31 after passing through a window 304 provided at the rear surface 301. In other words, the opening 911 functions as an aperture which restricts light incident to the wavelength variable interference filter 5. The opening 912 functions as an aperture which restricts light emitted from the wavelength variable interference filter 5. There may be a configuration in which a transparent window member is attached to the casing 91 so as to cover the openings 911 and 912, and the casing 91 is air-tightly sealed. In this case, if the casing 91 is in a decompressed state (for example, in a vacuum state), it is possible to improve responsiveness of the wavelength variable interference filter 5 stored therein.

The flange 913 which protrudes in the intersection direction is provided on a side surface 91A of the casing 91 in the optical axis L direction. The flange 913 is inserted into the groove 832 at a position which is located further toward the imaging apparatus 3 side than the protrusion 833 in the optical axis L direction. In the present embodiment, the flanges 913 are a pair of plate-shaped members provided at the casing 91 at positions opposing each other in the intersection direction.

The flanges 913 may be respectively provided on the opposing side surfaces 91A in the side surfaces 91A in the optical axis L direction, may be respectively provided on the entire side surfaces 91A, and may be integrally provided over the entire circumference of the side surfaces 91A.

The abutting section 92 which covers the periphery of the opening 912 and protrudes toward the imaging apparatus 3 side in the optical axis L direction is provided on the surface of the casing 91 on the imaging apparatus 3 side. A front end surface 921 of the abutting section 92 in the protruding direction (that is, the optical axis L direction) is a surface in the intersection direction.

The biasing section 93 is disposed between the flange 913 and the protrusion 833 facing each other in the optical axis L direction. The biasing section 93 biases the flange 913 (that is, the casing 91) relative to the protrusion 833 toward the imaging apparatus 3 in the optical axis L direction. In the present embodiment, a coil spring is exemplified as the biasing section 93, but the invention is not limited thereto. For example, a plate spring or the like may be used as the biasing section 93.

The respective electrode pads 563P and 564P of the wavelength variable interference filter 5 stored in the casing 91 are connected to external terminals of the casing 91 via extraction wires (not illustrated). The external terminals are connected to wires which are extracted from the circuit board 4 via flexible wires such as flexible printed circuits (FPCs). In addition, the external terminals of the casing 91 are not only connected to the wires via the FPC or the like, but may also be connected to the wires extracted from the circuit board 4, for example, as a result of a coil spring or a plate spring exemplified as the biasing section 93 being in contact with the wires.

In the positioning portion 9 configured as described above, the casing 91 is biased to the imaging apparatus 3 side by the biasing section 93.

During non-attachment in which the spectroscopic module 2 is not attached to the spectrometry system 1, the flange 913 is pressed toward the biasing section 93 in a state of abutting on an inner surface 832A of the groove 832 on the imaging apparatus 3 side. Here, an opening 831A of the through hole 831 on the imaging apparatus 3 side (light incidence side) has an inner diameter dimension larger than a dimension of the casing 91 in the intersection direction. When the flange 913 abuts on the inner surface 832A, the casing 91 is located inside the opening 831A. The front end surface 921 protrudes toward the light emission side of the opening 831A in the optical axis L direction.

On the other hand, during attachment, as illustrated in FIG. 8, the front end surface 921 abuts on the rear surface 301 of the imaging apparatus 3 so as to determine an angle of the wavelength variable interference filter 5 with respect to the optical axis L or to position the wavelength variable interference filter 5 in the optical axis L direction. In other words, during attachment, the casing 91 is pushed back from the rear surface 301 of the imaging apparatus 3 via the front end surface 921 in an opposite direction to the biasing direction of the biasing section 93. The casing 91 is moved in the opposite direction to the imaging apparatus 3 and is fixed relative to during non-attachment.

In the above-described manner, the wavelength variable interference filter 5 is disposed with a predetermined angle with respect to the optical axis L, for example, to be perpendicular thereto in the present embodiment.

In order to attach the spectroscopic module 2 to the imaging apparatus 3, part of the attachment unit 8 is configured to be freely opened and closed. For example, among the four sidewalls 82, the sidewall 82 opposing the sidewall 82 on which the communication unit 7 is provided is configured to be attachable and detachable. When the spectroscopic module 2 is attached, the sidewall 82 which is configured to be attachable and detachable is detached, the imaging apparatus 3 is inserted into the spectroscopic module 2, and the detached sidewall 82 is attached after the communication unit 7 is connected to the communication unit 34 described later of the imaging apparatus 3. In the above-described manner, the spectroscopic module 2 is attached to the imaging apparatus 3.

Configuration of Imaging Apparatus

During attachment, the imaging apparatus 3 images light which is spectrally separated by the spectroscopic module 2. In addition, during attachment, the imaging apparatus 3 is configured to be able to communicate with the spectroscopic module 2 and controls the spectroscopic module 2.

The imaging apparatus 3 includes, as illustrated in FIG. 1, an imaging unit 31, a light source unit 32, a display unit 33, a communication unit 34, an operation unit 35, a storage unit 36, and a control unit 37.

The imaging unit 31 includes an optical system 311 and an imaging element 312 and captures an image of the imaging target X (refer to FIG. 2). The optical system 311 focuses light from the imaging target X on the imaging element 312 under the control of the control unit 37. The optical system 311 includes a lens, an adjustment device which adjusts a focus position of the lens, and the like. The imaging element 312 receives the light focused by the optical system 311, and outputs a detection signal corresponding to an amount of the received light.

The light source unit 32 irradiates the imaging target X with illumination light. The light source unit 32 is, for example, an LED light source which applies white light. The light source unit 32 is not limited to the LED light source and may be various light sources such as a halogen lamp which can apply white light. The light source unit 32 may include not only a white light source but also a light source which can apply light with a predetermined wavelength such as infrared light.

The display unit 33 is various display devices such as a liquid crystal display or an organic EL display. As illustrated in FIG. 2, the display unit 33 is provided on the front surface 303 side of the imaging apparatus 3 and displays various images.

The communication unit 34 performs communication with the spectroscopic module 2. For example, the communication unit 34 transmits a control signal from the control unit 37 to the spectroscopic module 2 or receives various signals from the spectroscopic module 2. As illustrated in FIG. 1, the communication unit 34 performs communication with the spectroscopic module 2 through wired communication. The communication unit 34 may perform communication with the spectroscopic module 2 through wired communication using a LAN or the like, or through various kinds of wireless communication such as Wi-Fi, Bluetooth, or infrared communication. The communication unit 34 may perform communication with the spectroscopic module 2, or an external apparatus such as a server, via a LAN or the Internet through wired communication or wireless communication. In this case, various applications, data, or the like may be acquired from the external apparatus such as a server.

The operation unit 35 is, for example, a touch panel or buttons provided on a front surface of the display unit 33, and receives an input operation by a user.

The storage unit 36 is constituted by various storage devices such as a ROM and a RAM, and stores various data times, programs, and the like which are required to control the spectroscopic module 2 and the imaging apparatus 3. The data items are, for example, correlation data V-λ data indicating a wavelength of transmission light relative to a driving voltage which is applied to the electrostatic actuator 56. The storage unit 36 stores applications, programs, and the like for realizing respective functions of the control unit 37.

Configuration of Control Unit

The control unit 37 includes, for example, a light source control portion 371, a display control portion 372, an imaging control portion 373, a positional deviation detecting portion 374, a filter control portion 375, a light amount acquisition portion 376, a spectroscopic image acquisition portion 377, a region specifying portion 378, a target detecting portion 379, a target setting portion 380, and an analysis processing portion 381, which are realized through cooperation of specific hardware such as the CPU or the memory and software such as the program stored in the storage unit 36.

The control unit 37 controls of the spectroscopic module 2 and the imaging apparatus 3. In other words, the control unit 37 controls the electrostatic actuator 56 of the wavelength variable interference filter 5 included in the spectroscopic module 2 so as to control a measurement target wavelength of the wavelength variable interference filter 5. The control unit 37 causes light transmitted through the wavelength variable interference filter 5 to be imaged by the imaging unit 31 so that a spectroscopic image is acquired, and performs an analysis process based on the spectroscopic image.

The light source control portion 371 controls the light source control portion 371 to control turning-on and turning-off of the light source unit 32 on the basis of a user's operation instruction detected by the operation unit 35.

The display control portion 372 displays an image on the display unit 33. As images displayed on the display unit 33, there are, for example, a spectroscopic image which has already been acquired, a process result of an analysis process, an operation screen for operating the spectrometry system 1, and various notification images (an error notification image, a measurement end notification image, and the like) for notifying a user of operation circumstances of the spectrometry system 1. In addition, as images displayed on the display unit 33, there is, for example, a real-time image which is captured by the imaging unit 31 when a spectroscopic image is acquired or when an imaging target is selected (refer to FIG. 2).

FIG. 2 illustrates a state a real-time image captured by the imaging unit 31 is displayed on the display unit 33 in order to select the imaging target X. As described later in detail, the display control portion 372 displays a frame F indicating a region where an analysis process performed by the analysis processing portion 381 is performed, to overlap the real-time image on the display unit 33.

The imaging control portion 373 performs an automatic focusing process for adjusting a focus position of the optical system 311. The imaging control portion 373 drives the imaging element 312 to output a detection signal corresponding to an amount of received light. The imaging control portion 373 performs, for example, an automatic focusing process of adjusting a focus position of the optical system 311 so that the imaging target X (refer to FIG. 2) included in the region within the frame F is focused.

The positional deviation detecting portion 374 detects a positional deviation of the positioning portion 9, that is, detects a deviation of the wavelength variable interference filter 5 in the intersection direction which intersects the optical axis L, in a state in which the spectroscopic module 2 is attached to the imaging apparatus 3. The positional deviation detecting portion 374 detects a positional deviation of the wavelength variable interference filter 5, for example, in a case where part of the spectroscopic module 2 (for example, the attachment unit 8 or the positioning portion 9) is reflected in an acquired spectroscopic image or a real-time image. More specifically, a deviation of the wavelength variable interference filter 5 in the intersection direction is detected, for example, by detecting that a contour (refer to FIG. 8) of each of the openings 911 and 912 of the casing 91 is reflected in the spectroscopic image or the real-time image.

The filter control portion 375 acquires a voltage value (input value) of a driving voltage corresponding to a measurement wavelength on the basis of the V-λ data stored in the storage unit 36, and outputs a command signal for applying the acquired voltage value to the electrostatic actuator 56 of the wavelength variable interference filter 5. In addition, the filter control portion 375 performs detection of a change timing of a measurement wavelength, a change of the measurement wavelength, a change of a driving voltage corresponding to the change of the measurement wavelength, and a determination of measurement end on the basis of the various data items stored in the storage unit 36, and outputs command signals on the basis of the determination.

The light amount acquisition portion 376 acquires the detection signal output from the imaging element 312, and acquires an amount of light with a measurement wavelength which is transmitted through the wavelength variable interference filter 5 for each pixel position from the detection signal.

The spectroscopic image acquisition portion 377 acquires a spectroscopic image on the basis of the light amount measurement data and stores the spectroscopic image in the storage unit 36. In addition, the spectroscopic image acquisition portion 377 generates a spectroscopic image on the basis of the measurement wavelength, and color data and a measurement wavelength stored in the storage unit 36 when the spectroscopic image is acquired.

The region specifying portion 378 detects a region corresponding to the frame F illustrated in FIG. 2, that is, pixel positions in the spectroscopic image.

The target detecting portion 379 identifies a target reflected in a spectroscopic image or a real-time image to detect the target. In a case where a predetermined imaging target X which is set in advance is reflected, the target detecting portion 379 detects the imaging target X.

For example, in FIG. 2, an apple is reflected as an example of the imaging target X. The target detecting portion 379 identifies a target reflected in the image. As illustrated in FIG. 2, in a case where the apple is set as the imaging target X, it is detected that the apple is reflected. In the present embodiment, the detection of a target by the target detecting portion 379 is performed in a region corresponding to the frame F detected by the region specifying portion 378.

In relation to the detection of a target, for example, an edge thereof is detected in the image so as to specify a shape of the target, and thus the target is identified (for example, the kind of target such as the kind of fruit or the name of food is identified). For the detection of a target, other well-known various methods may be used without limitation.

The target setting portion 380 sets a target on which the analysis processing portion 381 performs an analysis process. For example, the target setting portion 380 causes a user to set whether or not a target detected by the target detecting portion 379 is set as a subsequent analysis target, so as to set an analysis target. The target setting portion 380 sets an analysis target by the user performing presetting.

The analysis processing portion 381 performs an analysis process on the analysis target set by the target setting portion 380 in the region detected by the region specifying portion 378. The analysis process includes, for example, a calculation process of an optical spectrum, and a component analysis process of the imaging target X based on the calculated optical spectrum. In a case where a target is required to be set despite an analysis target not being set by the target setting portion 380, an analysis process may be performed on all targets detected by the target detecting portion 379.

Operation of Spectrometry System

Next, a description will now be made of an operation performed by the above-described spectrometry system 1 with reference to the drawings.

Figure 9:
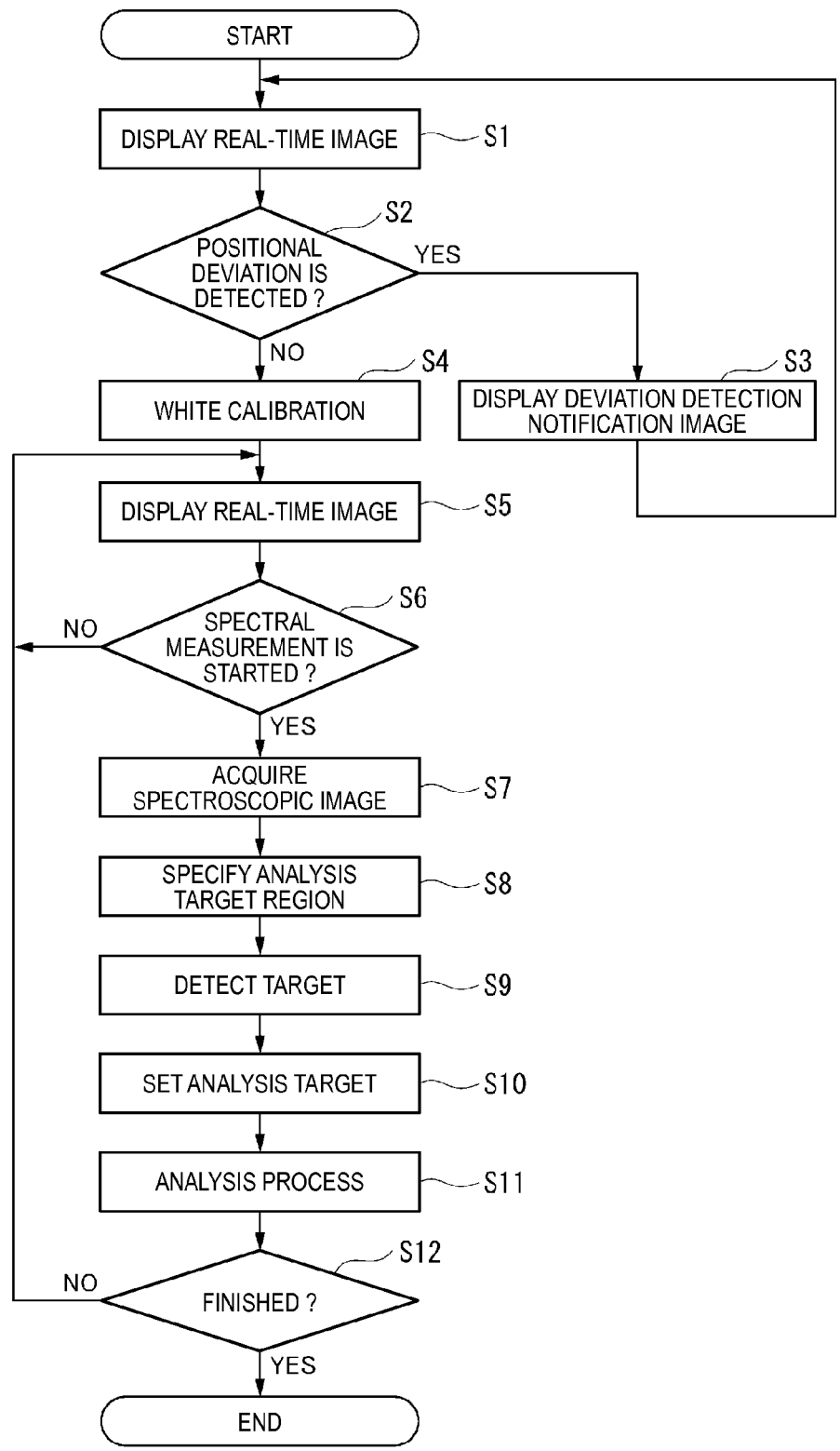
FIG. 9 is a flowchart illustrating an example of a spectral measurement process in the embodiment.

FIG. 9 is a flowchart illustrating an example of an operation performed by the spectrometry system.

First, as described above, the spectroscopic module is attached to the imaging apparatus 3. When the spectroscopic module 2 is attached to the imaging apparatus 3, the wavelength variable interference filter 5 is positioned with respect to the optical axis L of the imaging apparatus 3 by the casing 91.

If a dedicated application which is installed in the imaging apparatus 3 in advance and controls the spectrometry system 1 is activated, communication can be performed between the spectroscopic module 2 and the imaging apparatus 3, and a standby state occurs in which a spectral measurement can be performed.

In the standby state, if a real-time image is instructed to be displayed, the spectrometry system. 1 acquires and displays a real-time image as illustrated in FIG. 9 (step S1).

Specifically, spectroscopic images are acquired in predetermined wavelengths which are set in advance in respective wavelength regions of colors including, for example, R (for example, 610 nm to 760 nm), G (for example, 500 nm to 560 nm), and B (for example, 435 nm to 480 nm), that is, in three predetermined wavelengths (three bands) corresponding to R, G, and B. Then, the filter driving unit 41 sequentially applies driving voltages corresponding to the three predetermined wavelengths to the electrostatic actuator 56 on the basis of a command signal from the filter control portion 375. Therefore, light beams with the three predetermined wavelengths are sequentially transmitted through the wavelength variable interference filter 5 to be detected (imaged) by the imaging unit 31, and thus spectroscopic images corresponding to the wavelengths are sequentially acquired. The display control portion 372 combines the spectroscopic images corresponding to the respective colors including R, G, and B together, so as to generate a real-time image. The display control portion 372 displays a real-time image in which the frame F indicating a region for performing an analysis process overlaps the generated real-time image, on the display unit 33 (refer to FIG. 2).

Next, the positional deviation detecting portion 374 detects a positional deviation of the wavelength variable interference filter 5 relative to the imaging apparatus 3 on the basis of the real-time image (step S2). Specifically, as described above, the positional deviation detecting portion 374 detects a positional deviation of the positioning portion 9 on the basis of whether or not the portion (for example, a contour of each of the openings 911 and 912) of the spectroscopic module 2 is reflected in the acquired spectroscopic images or real-time image.

If the positional deviation of the positioning portion 9 is detected by the positional deviation detecting portion 374 (Yes in step S2), the display control portion 372 displays a deviation detection notification image for notifying that the positional deviation has been detected, on the display unit 33 (step S3). Although the acquired real-time image is displayed in step S1, the acquired real-time image may only be used to detect a positional deviation in step S3 and may not be displayed.

On the other hand, if the positional deviation of the positioning portion 9 is not detected by the positional deviation detecting portion 374 (No in step S2), a white reference plate (not illustrated) is measured, and thus white calibration is performed (step S4).

If the white calibration is completed, the real-time image is acquired and is displayed in the same manner as in step S1 (step S5).

Then, the spectrometry system 1 displays the real-time image (step S5) until an instruction for starting a spectral measurement is received (No in step S6).

If the instruction for starting a spectral measurement is received (Yes in step S6), the spectroscopic images are acquired (step S7).

The instruction for starting a spectral measurement is made, for example, by a user's operation. In this user's operation, for example, the user inputs the instruction for starting a spectral measurement by using the operation unit 35 in a state in which an imaging direction of the spectrometry system 1 is adjusted, so that the imaging target X is included in the frame F which is displayed to overlap the real-time image (refer to FIG. 2).

If the instruction for starting a spectral measurement is received, the filter control portion 375 reads the V-λ data from the storage unit 36, and outputs, to the filter driving unit 41 of the spectroscopic module 2, a command signal for applying a driving voltage corresponding to a measurement wavelength to the electrostatic actuator 56 of the wavelength variable interference filter 5. The filter driving unit 41 applies a voltage based on the command signal to the wavelength variable interference filter 5 so as to set a wavelength (measurement wavelength) of light which is transmitted through the wavelength variable interference filter 5. The imaging control portion 373 drives the imaging element 312 to image light with each wavelength which has been transmitted through the wavelength variable interference filter 5. The spectrometry system 1 sequentially changes voltages applied to the electrostatic actuator 56 so as to change wavelengths of light transmitted through the wavelength variable interference filter 5 at predetermined intervals (for example, nm), and thus acquires a spectroscopic image of each wavelength. The spectroscopic image is generated on the basis of the color data which is stored in the imaging apparatus 3 in advance. As mentioned above, the color data stored in the imaging apparatus 3 is used, and thus the spectroscopic module 2 is not required to hold the color data, thereby simplifying a configuration thereof.

Next, the region specifying portion 378 detects a region corresponding to the frame F in which the imaging target X is imaged in the spectroscopic image, that is, pixel positions in the spectroscopic image (step S8).

Next, the target detecting portion 379 identifies a target reflected in the spectroscopic image in the detected region so as to detect the imaging target X (step S9). Specifically, as illustrated in FIG. 2, in a case where the apple is imaged as the imaging target X, the target detecting portion 379 detects that the imaging target X is the apple.

Then, the target setting portion 380 performs various analysis processes on the region detected by the region specifying portion 378. As an example of the analysis process, a component analysis process of the apple which is the imaging target X is performed.

Next, the target setting portion 380 sets a target on which an analysis process is performed by the analysis processing portion 381 (step S10). For example, the target setting portion 380 causes the user to select whether or not the target detected by the target detecting portion 379 is set as an analysis target. In addition, for example, in a case where there are a plurality of targets detected by the target detecting portion 379, the target setting portion 380 causes the user to select any one of the targets. The target setting portion 380 causes the user to set whether or not a target detected by the target detecting portion 379 is set as a subsequent analysis target. More specifically, in response to an instruction from the target setting portion 380, the display control portion 372 displays setting display for selecting an analysis target on the display unit 33. The target setting portion 380 sets the target selected by the user as an analysis target.

As in a case where an analysis target is set in advance by the target setting portion 380, in a case where a new analysis target is not required to be set, step S10 may be omitted.

The analysis processing portion 381 performs an analysis process on the analysis target set by the target setting portion 380 in a region detected by the region specifying portion 378 (step S11).

In a case where a target is required to be set despite an analysis target not being set by the target setting portion 380, an analysis process may be performed on all targets detected by the target detecting portion 379.

The control unit 37 determines whether or not the measurement is finished (step S12). If the measurement is not finished (No in step S12), the flow returns to step S5, and the subsequent processes are performed. If the measurement is finished (Yes in step S12), the control unit 37 stops the dedicated application.

Operations and Effects of First Embodiment

In the spectrometry system 1 of the present embodiment, the spectroscopic module 2 is configured to be attachable to and detachable from the imaging apparatus 3.

In this configuration, the spectroscopic module 2 and the imaging apparatus 3 can be formed as separate bodies. As the imaging apparatus 3, an apparatus such as a digital camera or a smart phone which is generally wide spread and has an imaging function may be used, and the spectroscopic module 2 is configured to be attachable to and detachable from the apparatus. Therefore, versatility of the spectrometry system 1 can be improved.

In the attachment unit 8 of the spectroscopic module 2, the wavelength variable interference filter 5 can be positioned with respect to the optical axis L by the positioning portion 9 during attachment.

Here, if deviations exceeding allowable ranges occur in a position, a distance, and an angle of the spectroscopic unit with respect to an incidence optical axis, there is a concern that accuracy of a spectral measurement may be reduced. For example, in the wavelength variable interference filter 5, if an angle of incident light changes, a selection wavelength changes. In addition, if a positional deviation occurs in the direction intersecting the optical axis, there is a concern that light may be incident to regions other than an effective region which functions as an etalon element in the wavelength variable interference filter 5. As mentioned above, if a position of the wavelength variable interference filter 5 relative to the imaging apparatus 3 or an angle of incident light to the wavelength variable interference filter 5 changes, there is a concern that an error may occur in which a spectral measurement cannot be performed with desired accuracy.

In the present embodiment, the positioning portion can determine an angle of the wavelength variable interference filter 5 with respect to the optical axis L, a position in the direction intersecting the optical axis L, or a distance relative to the imaging apparatus 3 in the optical axis L direction. More specifically, the casing 91 is biased by the biasing section 93, and thus the abutting section 92 provided at the casing 91 abuts on the imaging apparatus 3. Consequently, the wavelength variable interference filter 5 held in the casing 91 is positioned. Therefore, it is possible to improve accuracy of a spectral measurement.

With the simple configuration in which the casing 91 provided with the abutting section 92 is biased toward the imaging apparatus 3 side by the biasing section 93, it is possible to position the wavelength variable interference filter 5.

If the spectroscopic module 2 has only to be attached to the imaging apparatus 3, it is possible to position the wavelength variable interference filter 5 even if complex setting operations are not performed.

The attachment unit 8 is attached to the imaging apparatus 3 in a state in which the side surface 302 of the imaging apparatus 3 is covered with the sidewall 82 of which the plurality of protrusions 823 are provided on the inner surface 822. At this time, the attachment unit 8 is attached to the imaging apparatus 3 in a state in which the protrusions 823 abut on the side surface 302 of the imaging apparatus 3.

In this configuration, front ends of the protrusions 823 abut on the side surface 302 of the imaging apparatus 3, and relative positions between the imaging apparatus 3 and the attachment unit 8 in the intersection direction is fixed. Positions of the front ends of the protrusions 823 are appropriately set, and thus positions of the imaging apparatus 3 and the attachment unit 8 can be set. In this case, since positions of the front ends are preferably set, positions in the intersection direction can be more appropriately set.

In the present embodiment, the wavelength variable interference filter 5 which is a Fabry-Perot etalon is used as an example of a spectroscopic element. Consequently, a dimension between the pair of reflective surfaces is sequentially changed, and therefore it is possible to extract light beams with a plurality of wavelengths and thus to reduce time required for a measurement. The Fabry-Perot etalon can be miniaturized and thus allows the spectrometry system 1 and the spectroscopic module 2 to be miniaturized when compared with a case of using, for example, an acousto-optic tunable filter (AOTF) or a liquid crystal tunable filter (LCTF).

The control unit 37 includes the positional deviation detecting portion 374 which detects a positional deviation of the wavelength variable interference filter 5, and detects a positional deviation when the spectroscopic module 2 is attached to the imaging apparatus 3. Consequently, it is possible to prevent a spectral measurement from being performed in a state in which a positional deviation occurs.

Particularly, in the present embodiment, in a case where part of the spectroscopic module 2 is reflected in an image captured by the imaging apparatus 3, the positional deviation detecting portion 374 detects the part of the spectroscopic module 2. Consequently, it is possible to detect a positional deviation of the spectroscopic module 2 that is, a positional deviation of the wavelength variable interference filter 5 in the intersection direction.

Second Embodiment

Next, a second embodiment of the invention will be described with reference to the drawings.

In the above-described first embodiment, the spectroscopic module 2 includes the casing-like attachment unit 8 which covers the entire rear surface 301 and all the side surfaces 302 of the imaging apparatus 3. In contrast, in the second embodiment, a spectroscopic module is configured so that an arrangement position of the positioning portion 9 which pinches an imaging apparatus from both sides and holds the wavelength variable interference filter 5 is changeable in a pinch direction.

In the following description, the same constituent elements as in the first embodiment are given the same reference numerals, and description thereof will be omitted or made briefly.

Figure 10:
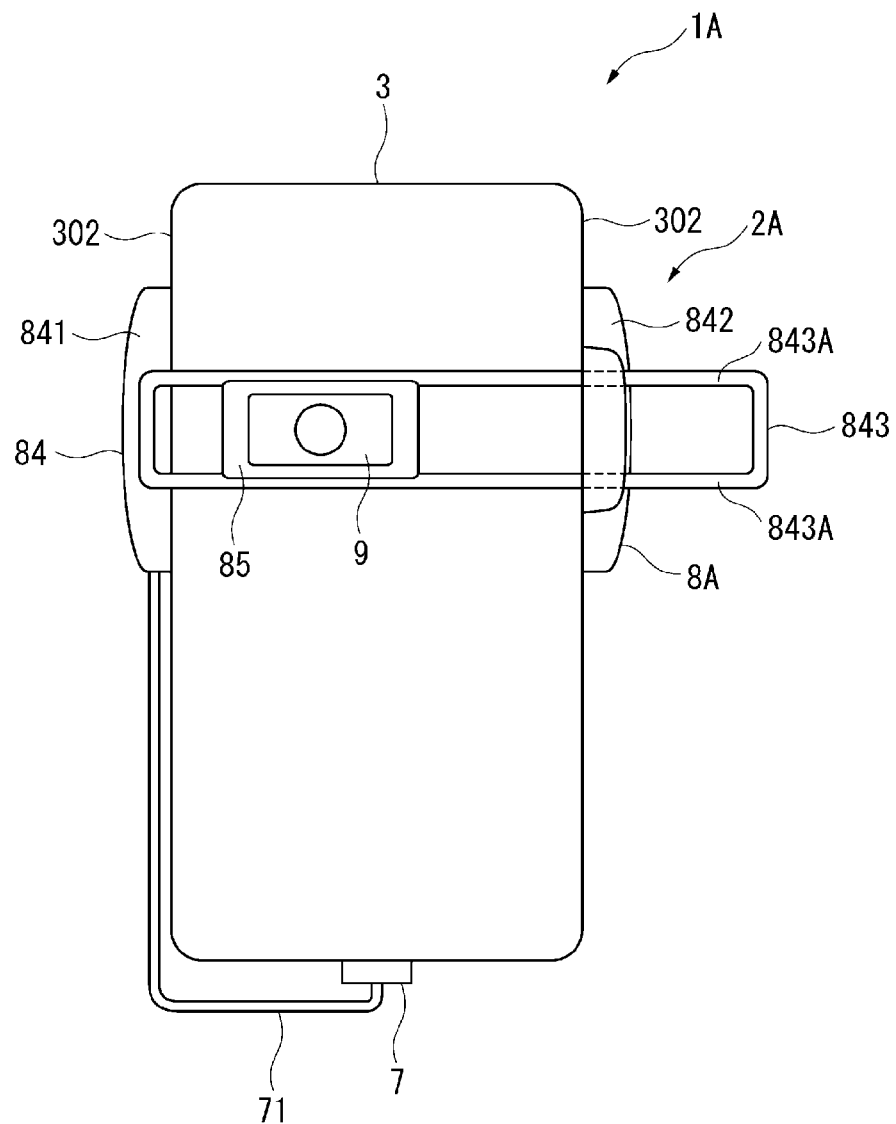
FIG. 10 is a rear view schematically illustrating a spectrometry system of a second embodiment.

FIG. 10 is a diagram illustrating a schematic configuration of a spectrometry system 1A according to the second embodiment.

As illustrated in FIG. 10, the spectrometry system 1A includes a spectroscopic module 2A and an imaging apparatus 3. The spectroscopic module 2A includes a circuit board 4, a wavelength variable interference filter 5, and light source unit 6, which are not illustrated, a communication unit 7, and an attachment unit 8A.

The attachment unit 8A includes a pinch portion 84 which pinches the side surfaces 302 of the imaging apparatus 3 in the intersection direction, and a base 85 provided with a positioning portion 9.

The pinch portion 84 includes a first contact section 841 which comes into contact with one of the pair of side surfaces 302, a second contact section 842 which comes into contact with the other thereof, and a connection section 843 which connects the contact sections 841 and 842 so as to freely change a distance between the contact sections 841 and 842.

In the present embodiment, the circuit board 4 is provided at the first contact section 841. The first contact section 841 is connected to the communication unit 7 via a cable 71.

The connection section 843 has a rectangular exterior with the pinch direction of the pinch portion 84 as a longitudinal direction. The connection section 843 has a pair of rails 843A which are parallel to each other in the pinch direction, and both ends of the rains 843A are connected to each other in a direction perpendicular to the pinch direction.

One end of the connection section 843 in the pinch direction is fixed to the first contact section 841. The second contact section 842 is engaged between the pair of rails 843A, and the second contact section 842 can be moved in the pinch direction along the connection section 843.

The base 85 is engaged between the pair of rails 843A and can thus be moved in the pinch direction along the connection section 843. In addition, the base 85 has the above-described storage section 83 which stores the positioning portion 9 therein.

In the attachment unit 8A configured as mentioned above, the second contact section 842 is moved along the connection section 843 in a state in which the connection section 843 is brought into contact with the rear surface 301 side of the imaging apparatus 3 and the first contact section 841 is brought into contact with one side surface 302, and thus the second contact section 842 is brought into contact with the other side surface 302. Consequently, the pinch portion 84 pinches the imaging apparatus 3 in the pinch direction. Then, the base 85 is moved along the connection section 843 so that the opening 912 of the positioning portion 9 is located at a position of the window 304 provided in the rear surface 301 of the imaging apparatus 3. In other words, the base 85 is moved to an arrangement position where the wavelength variable interference filter 5 is disposed on the optical axis L. In the above-described manner, the attachment unit 8A is attached to the imaging apparatus 3. In the spectrometry system 1A, the base 85 is retracted to a retraction position from the arrangement position (is moved to the retraction position), and can thus be changed to a state in which a normal image can be captured.

Operations and Effects of Second Embodiment

The pinch portion 84 pinches the imaging apparatus 3, and thus the spectroscopic module 2 is attached to the imaging apparatus 3. In this configuration, with the simple operation in which the pinch portion 84 pinches the imaging apparatus 3, the spectroscopic module 2 can be attached to the imaging apparatus 3. For this reason, it is possible to easily attach and detach the spectroscopic module 2 to and from the imaging apparatus 3 and thus to improve convenience.

The contact sections 841 and 842 are connected to each other via the connection section 843 so that a distance in the pinch direction can be changed. The base 85 is configured to be movable along the connection section 843.

In this configuration, the spectroscopic module 2 can be attached to the imaging apparatus 3 with a plurality of width dimensions. The base 85 can be moved according to a position of the imaging element 312 of the imaging apparatus 3, and thus a position of the wavelength variable interference filter 5 can be set on the optical axis of the imaging element 312. Therefore, the spectroscopic module 2 can also be attached to a plurality of imaging apparatuses 3 having different width dimensions or different positions of the imaging element 312, and thus it is possible to provide the spectroscopic module 2 and the spectrometry system 1 having high versatility.

When a spectral measurement is performed, the base 85 can be moved to the arrangement position on an optical path of incident light, and when a normal image is captured without performing the spectral measurement, the base 85 can be moved to the retraction position so as to be retracted from the optical path. For this reason, even if the spectroscopic module 2A is not detached, a normal image can be captured. Therefore, it is possible to improve convenience in both a case where a spectroscopic image is captured and a case where a normal image is captured.

Third Embodiment

Next, a third embodiment of the invention will be described with reference to the drawings.

In the above-described first embodiment, a configuration has been exemplified in which white calibration is performed by using a white reference plate (not illustrated). In contrast, in the third embodiment, a spectroscopic module includes a white reference arrangement portion which moves a white reference plate between an arrangement position where the white reference plate is disposed and a retraction position where the white reference plate is retracted, with respect to an imaging position.

Figure 11:
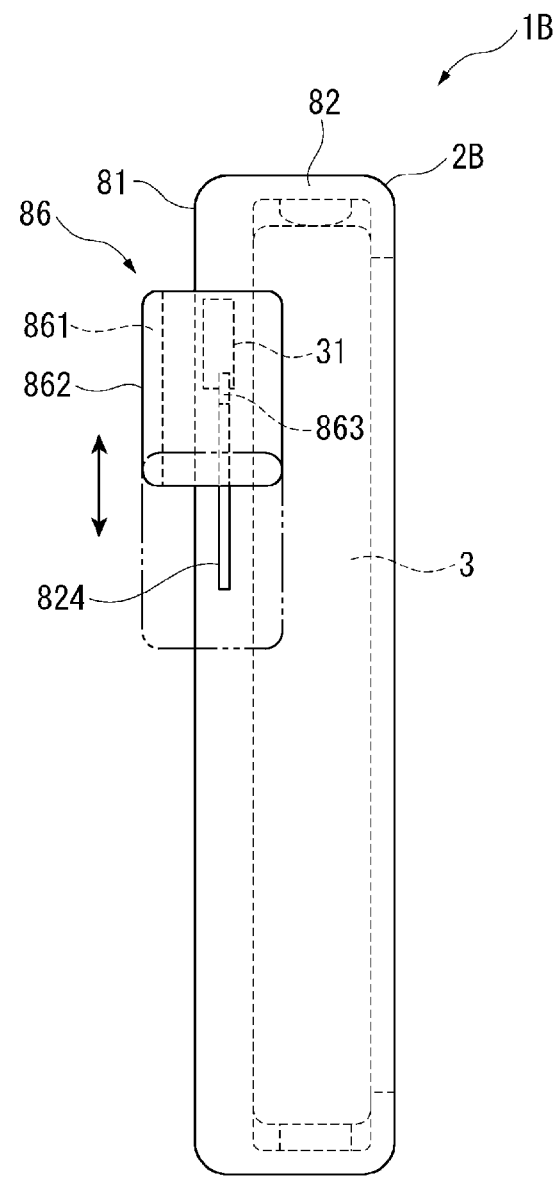
FIG. 11 is a side view schematically illustrating a spectrometry system of a third embodiment.

FIG. 11 is a side view illustrating a schematic configuration of a side surface of a spectrometry system 1B according to the third embodiment.

Figure 12:
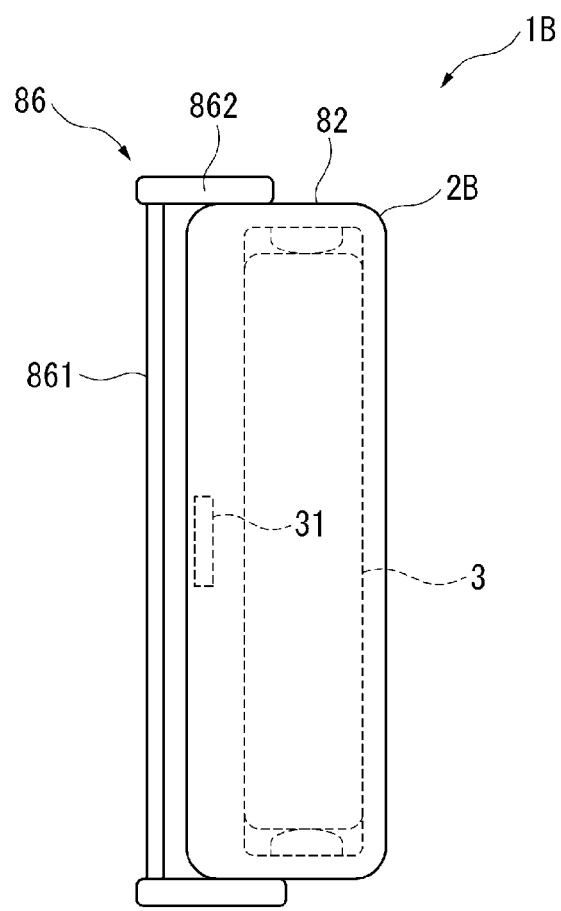
FIG. 12 is a top view schematically illustrating the spectrometry system of the embodiment.

FIG. 12 is a top view illustrating a schematic configuration of an upper surface perpendicular to the side surface illustrated in FIG. 11 of the spectrometry system 1B according to the third embodiment.

As illustrated in FIGS. 11 and 12, the spectrometry system 1B has substantially the same configuration as that of the spectrometry system 1 of the first embodiment except that a spectroscopic module 2B includes a white reference arrangement portion 86.

The white reference arrangement portion 86 includes a white reference plate 861 facing the rear surface portion 81, and a pair of holding sections 862 which are respectively fixed to a pair of side surfaces in the intersection direction and hold the white reference plate 861. The white reference plate 861 corresponds to a reference plate according to the invention.

The holding sections 862 are disposed along the side surfaces 302 of the imaging apparatus 3. An insertion part 863 which protrudes toward the side surface 302 and is inserted into a guide groove 824 provided on the side surface 302 is provided on a surface of each of the holding sections 862 on the side surface 302 side. The guide groove 824 is provided in a longitudinal direction (a vertical direction of FIG. 11) of the side surface 302.

The white reference arrangement portion 86 configured as mentioned above moves the white reference plate 861 between an arrangement position where the white reference plate 861 is disposed on the optical axis L and a retraction position (a position indicated by the two-dot chain line of FIG. 11) where the white reference plate 861 is retracted therefrom.

In the spectrometry system 1B of the present embodiment, a spectral measurement of the white reference plate 861 is performed and the white calibration is performed in a state in which the white reference plate 861 is disposed at eh arrangement position.

Operations and Effects of Third Embodiment

The spectroscopic module 2B includes the white reference arrangement portion 86 which moves the white reference plate 861 between the arrangement position and the retraction position.

In this configuration, when the white reference plate 861 is imaged in order to acquire a reference, the white reference plate 861 can be appropriately disposed at a predetermined position (arrangement position) with respect to the imaging apparatus 3. Consequently, it is possible to appropriately acquire a reference and thus to improve accuracy of a spectral measurement. Particularly, also in a case where the spectroscopic module 2B is attached to any imaging apparatus, and thus the spectrometry system 1B is configured, it is possible to more appropriately perform calibration of the spectrometry system 1B according to color data of the imaging apparatus 3 or specifications of the imaging apparatus 3 such as performance (characteristics) of the imaging unit 31.

Modification of Third Embodiment

In the third embodiment, the holding sections 862 engaged with the guide grooves 824 are moved along the guide grooves 824. Consequently, the white reference plate 861 held at the holding sections 862 are moved between the arrangement position and the retraction position along the rear surface portion 81. The invention is not limited to the configuration of the third embodiment, and any configuration may be used as long as the white reference plate can be moved. For example, a configuration described later, illustrated in FIG. 13 may be exemplified.

Figure 13:
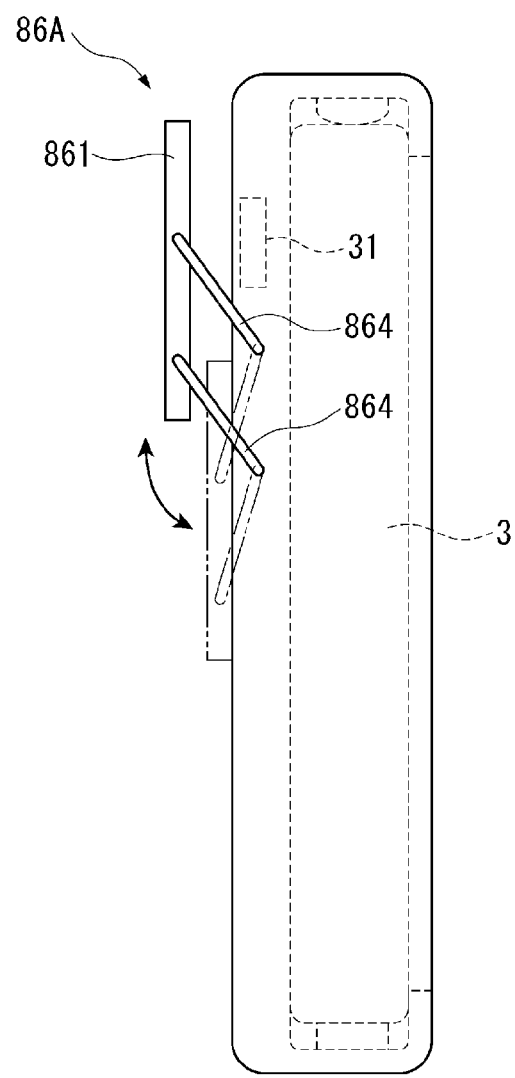
FIG. 13 is a side view schematically illustrating a modification example of the embodiment.

FIG. 13 is a side view illustrating a schematic configuration of a side surface of a spectrometry system according to a modification example of the third embodiment.

In the modification example shown in FIG. 13, a white reference arrangement portion 86A includes a white reference plate 861 and holding sections 864 which are respectively engaged with a pair of side surfaces of the white reference plate 861 and hold the white reference plate 861.

The white reference plate 861 is held by two holding sections 864 for each of the pair of side surfaces, that is, a total of four holding sections 864 with respect to the side surfaces 302.

An end of each of the holding sections 864 on the white reference plate 861 side is slidably inserted into a hole which is provided on a side surface of the white reference plate 861 in the intersection direction. Similarly, an end of the holding section 864 on the side surface 302 side is also slidably inserted into a hole which is provided on the side surface 302 in the intersection direction.

In the white reference arrangement portion 86A configured as mentioned above, the white reference plate 861 is moved between an arrangement position and a retraction position (a position indicated by the two-dot chain line of FIG. 13) according to rotation of the holding sections 864.

Fourth Embodiment

In the above-described first embodiment, the spectroscopic module 2 including a single wavelength variable interference filter 5 has been exemplified. In contrast, in the present embodiment, a plurality of wavelength variable interference filters are provided.

Figure 14:
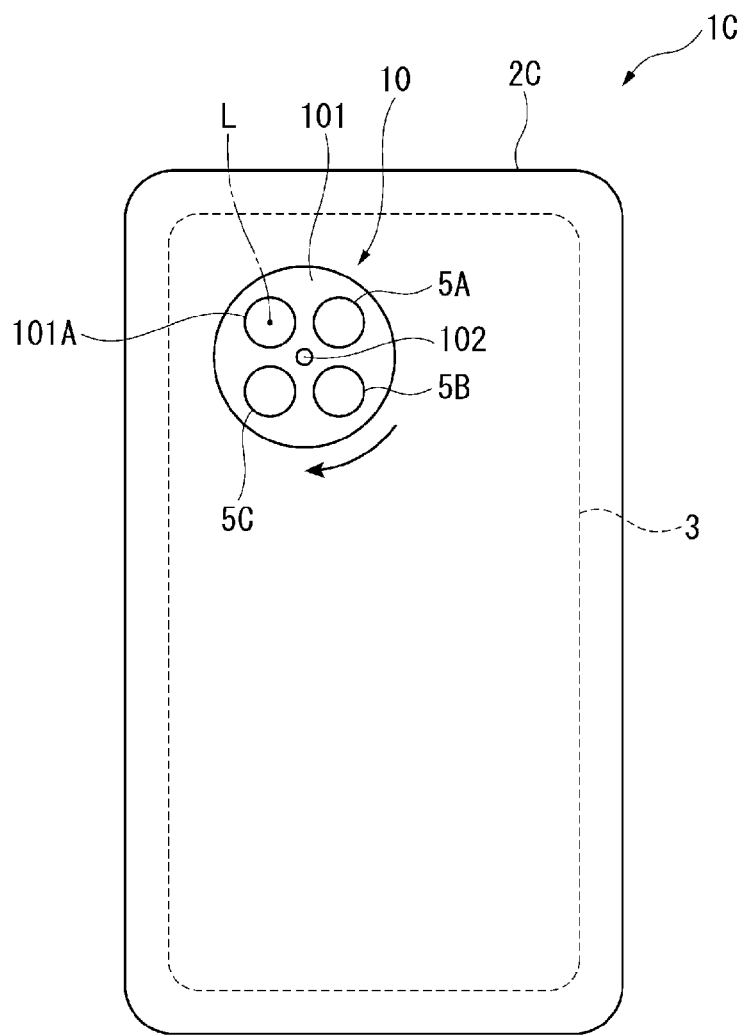
FIG. 14 is a rear view schematically illustrating a spectrometry system of a fourth embodiment.

FIG. 14 is a rear view illustrating a schematic configuration of a spectrometry system 1C according to the fourth embodiment.

As illustrated in FIG. 14, a spectroscopic module 2C includes a plurality of wavelength variable interference filters 5A, 5B and 5C, and a changing unit 10 which disposes any one of the plurality of wavelength variable interference filters 5A, 5B and 5C on the optical axis L and changes a use wavelength variable interference filter as necessary.

The changing unit 10 includes a rotation portion 101 which holds the wavelength variable interference filters 5A, 5B and 5C and is rotated in a surface perpendicular to the optical axis L, and a rotation shaft 102 of the rotation portion 101.

Each of the wavelength variable interference filters 5A, 5B and 5C is held at the rotation portion 101 to be located on the circumference of a circle which passes through a passing position of the optical axis L with respect to the rotation shaft 102. In the rotation portion 101, an opening 101A is provided on the circumference of the circle on which the wavelength variable interference filters 5A, 5B and 5C. In addition, in the rotation portion 101, the positioning portion 9 and the storage section 83 are provided at each of the wavelength variable interference filters 5A, 5B and 5C.

In the spectrometry system 1C configured as mentioned above, for example, as indicated by an arrow of FIG. 14, the rotation portion 101 is rotated in the surface perpendicular to the optical axis L, and thus any one of the wavelength variable interference filters 5A, 5B and 5C and the opening 101A is set on the optical axis L.

In the present embodiment, the wavelength variable interference filters 5A, 5B and 5C have different selectable wavelength regions (for example, a near-infrared region, a visible-light region, an ultraviolet region, and the like).

Operations and Effects of Fourth Embodiment

In the present embodiment, the rotation portion 101 on which the wavelength variable interference filters 5A, 5B and 5C are disposed is rotated, and thus a wavelength variable interference filter which is disposed on the optical axis is changed. The positioning portion 9 is provided at each of the wavelength variable interference filters 5A, 5B and 5C.

In this configuration, a wavelength variable interference filter which is to be used can be selected as necessary from among a plurality of wavelength variable interference filters having different wavelength ranges. Consequently, it is possible to extend a wavelength range which can be measured in the spectrometry system 1B.

Also in a case where the wavelength variable interference filter is changed, the above-described positioning is performed every time, and thus it is possible to minimize a reduction in measurement accuracy due to a change of the wavelength variable interference filter.

Fifth Embodiment

The fact is known that a wavelength of emitted light changes depending on an incidence angle of incident light to the wavelength variable interference filter 5. Therefore, in a case where regions corresponding to a whole angle of view of the imaging element 312 is set as analysis targets, there is a concern that a wavelength of received light may differ depending on a region, and thus there is a concern that an analysis result may be influenced thereby.

In the present embodiment, an image region of a spectroscopic image of incident light which is incident to the wavelength variable interference filter 5 in a predetermined angle range is set as an analysis target. Consequently, it is possible to minimize a reduction in analysis accuracy due to a difference in a wavelength of received light in a region which is set as the analysis target.

Figure 15:
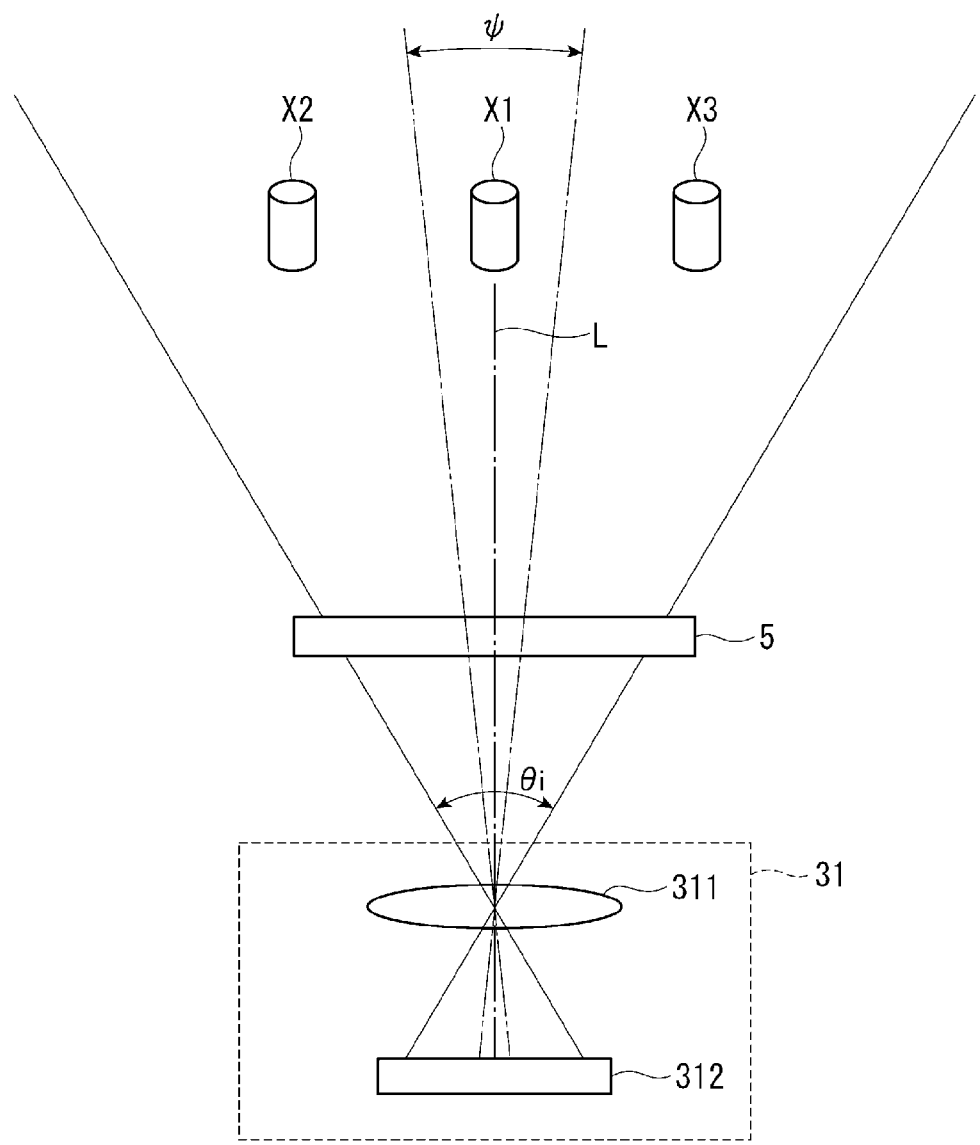
FIG. 15 is a diagram schematically illustrating main portions of a spectrometry system of a fifth embodiment.

FIG. 15 is a diagram schematically illustrating a positional relationship between the wavelength variable interference filter 5, the imaging unit 31, and a measurement target.

When the spectroscopic module 2 is attached to the imaging apparatus 3, and thus relative positions of the wavelength variable interference filter 5 and the imaging element 312 are determined, an angle range in which a spectroscopic image can be acquired by the imaging element 312, that is, an angle of view $\theta i$ is also determined.

The angle of view $\theta i$ may be calculated by using an area of an effective region which allows interference light of the wavelength variable interference filter 5 to be emitted, an area of a light receiving surface of the imaging element 312, and a distance between the wavelength variable interference filter 5 and the imaging element 312.

The angle of view $\theta i$ may be set for the imaging apparatus 3 in advance, and may be calculated. For example, when the spectroscopic module 2 is attached to the imaging apparatus 3, a distance between the wavelength variable interference filter 5 and the imaging element 312 is acquired, and the angle of view $\theta i$ is calculated by using the distance.

On the other hand, an allowable angle $\psi$ which is an allowable angle range of an incidence angle of incident light to the wavelength variable interference filter 5 is set in accordance with a specification of the wavelength variable interference filter 5, measurement accuracy, or the like. The allowable angle $\psi$ is an angle range centering on the optical axis L of the optical system 311 of the imaging unit 31. The allowable angle $\psi$ may be changed depending on measurement accuracy or the like.

Light from a target X1 included in a range of the allowable angle $\psi$ with respect to the wavelength variable interference filter 5 has a wavelength included in a predetermined range corresponding to a desired measurement accuracy range relative to a set wavelength of the wavelength variable interference filter 5.

Figure 16:
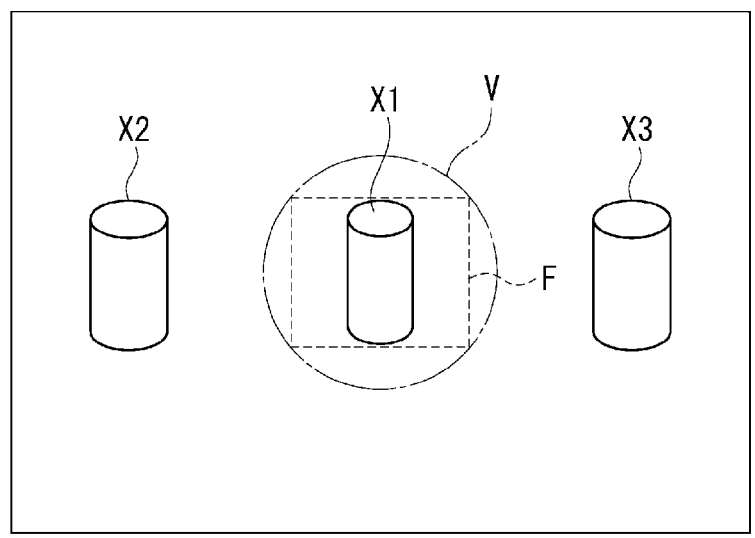
FIG. 16 is a diagram illustrating an example of a display screen in a display unit of the embodiment.

FIG. 16 is a diagram schematically illustrating an example of a display image which is displayed on the display unit 33 on the basis of a captured image which is captured by the imaging unit 31 disposed relative to the wavelength variable interference filter 5 with the positional relationship illustrated in FIG. 15.

The image illustrated in FIG. 16 is an image captured in a range of the angle of view $\theta i$ centering on the optical axis of the imaging apparatus 3. In FIG. 16, a virtual region V corresponding to the allowable angle $\psi$ is indicated by a dot chain line. The virtual region V is an image region corresponding to incident light in the range of the allowable angle $\psi$ in the captured image corresponding to the angle of view $\theta i$. In the present embodiment, an analysis process on the virtual region V is performed.

In the present embodiment, the region specifying portion 378 sets the frame F indicating a region on which the above-described analysis process is performed to be included in the virtual region V. In other words, the region specifying portion 378 acquires the virtual region V on the basis of the angle of view $\theta i$ and the allowable angle $\psi$. The spectrometry system sets the frame F on the basis of the virtual region V, and causes the frame F to overlap a real-time image (the captured image) and to be displayed on the display unit 33 (refer to FIG. 16). As described above, the region specifying portion 378 detects a region corresponding to the frame F illustrated in FIG. 2, that is, pixel positions in a spectroscopic image. The frame F is exemplified as having a rectangular shape which is inscribed in the circular virtual region V is exemplified, but may have any shape as long as the shape is included in the virtual region V.

A user adjusts an imaging direction of the imaging apparatus 3 so that the target X1 is included in the frame F while referring to the real-time image displayed on the display unit 33 (refer to FIG. 16). The target X1 included in the frame F is set as an analysis target. Targets X2 and X3 which are not included in the frame F are not set as analysis targets.

Operations and Effects of Fifth Embodiment

In the spectrometry system, the virtual region V is specified which is an image region corresponding to light incident to the wavelength variable interference filter 5 in a range of the allowable angle ψ in a captured image, and an analysis process is performed on a region included in the virtual region V.

The fact is known that a wavelength of emitted light changes depending on an incidence angle of incident light to the wavelength variable interference filter 5. For this reason, if an analysis process is preformed on a region including an image region of incident light which is incident at an angle at which an error of a wavelength of emitted light relative to a set wavelength exceeds an allowable value, there is a concern that desired analysis accuracy may not be maintained.

In the present embodiment, an analysis process target can be set to an image region of light which is incident in a rage of the allowable angle ψ. For this reason, it is possible to minimize a reduction in analysis accuracy. Particularly, in a case where the wavelength variable interference filter 5 is used as a spectroscopic element, since light can be limited to incident light which is incident in an allowable angle range, it is possible to reduce a deviation in a wavelength of emitted light and thus to more effectively minimize a reduction in measurement accuracy.

In the present embodiment, the frame F indicating an analysis region which is an analysis process target overlaps the real-time image (captured image) so as to be displayed on the display unit 33. For this reason, it is possible to adjust an imaging direction of the imaging apparatus 3 while referring to an image displayed on the display unit 33 and thus to easily adjust the imaging direction so that a measurement target is included in an analysis region.

Modifications of Embodiment

The invention is not limited to the above-described embodiments, and modifications, alterations, and the like in the scope of being capable of achieving the object of the invention are included in the invention.

Figure 17:
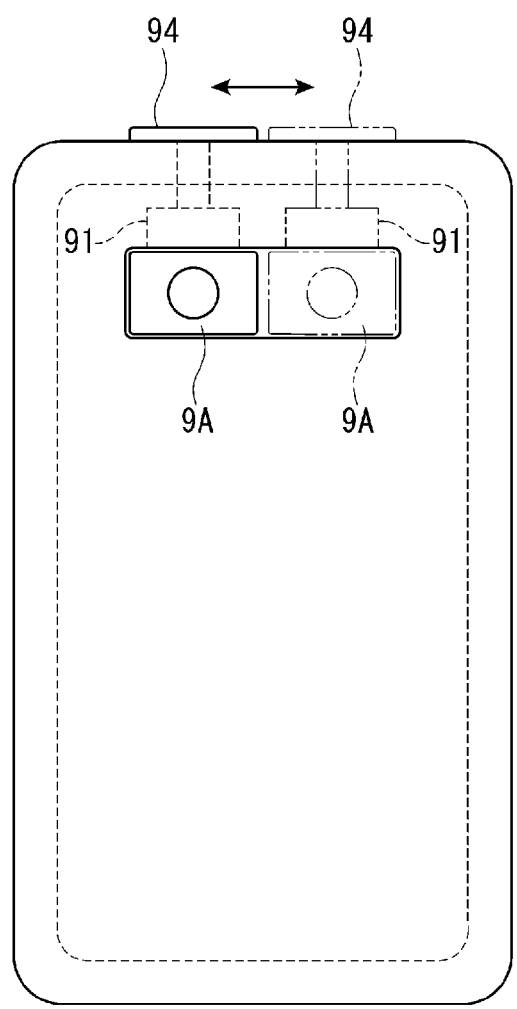
FIG. 17 is a rear view illustrating a modification example of the spectrometry system.

For example, in the above-described first embodiment, as illustrated in FIG. 17, the positioning portion is movably configured in the same manner as in the second embodiment. In FIG. 17, a positioning portion 9A can be moved in a direction perpendicular to a longitudinal direction along the side surface 302. A pinch 94 for moving the positioning portion 9A is provided on the side surface 302 in a direction perpendicular to the longitudinal direction. A casing 91 of the positioning portion 9A is connected to the pinch 94.

In this configuration, when a spectral measurement is performed, the positioning portion 9A can be moved to an arrangement position on the optical axis L, and when a normal image is captured without performing the spectral measurement, the positioning portion 9A can be retracted from the optical axis L. For this reason, even if the spectroscopic module is not detached from the imaging apparatus 3, a normal image can be captured. Therefore, it is possible to improve convenience in both a case where a spectroscopic image is captured and a case where a normal image is captured.

FIG. 17 exemplifies a configuration in which a user can manually change a position of the wavelength variable interference filter 5, but there may be a configuration in which a driving mechanism such as a motor or a guide rail is provided, and a position can be changed under the control of a control unit.

In the above-described respective embodiments, a configuration has been exemplified in which reflection of the spectroscopic module in a captured image is detected by the positional deviation detecting portion 374, and a positional deviation can be detected, but the invention is not limited thereto.

Figure 18:
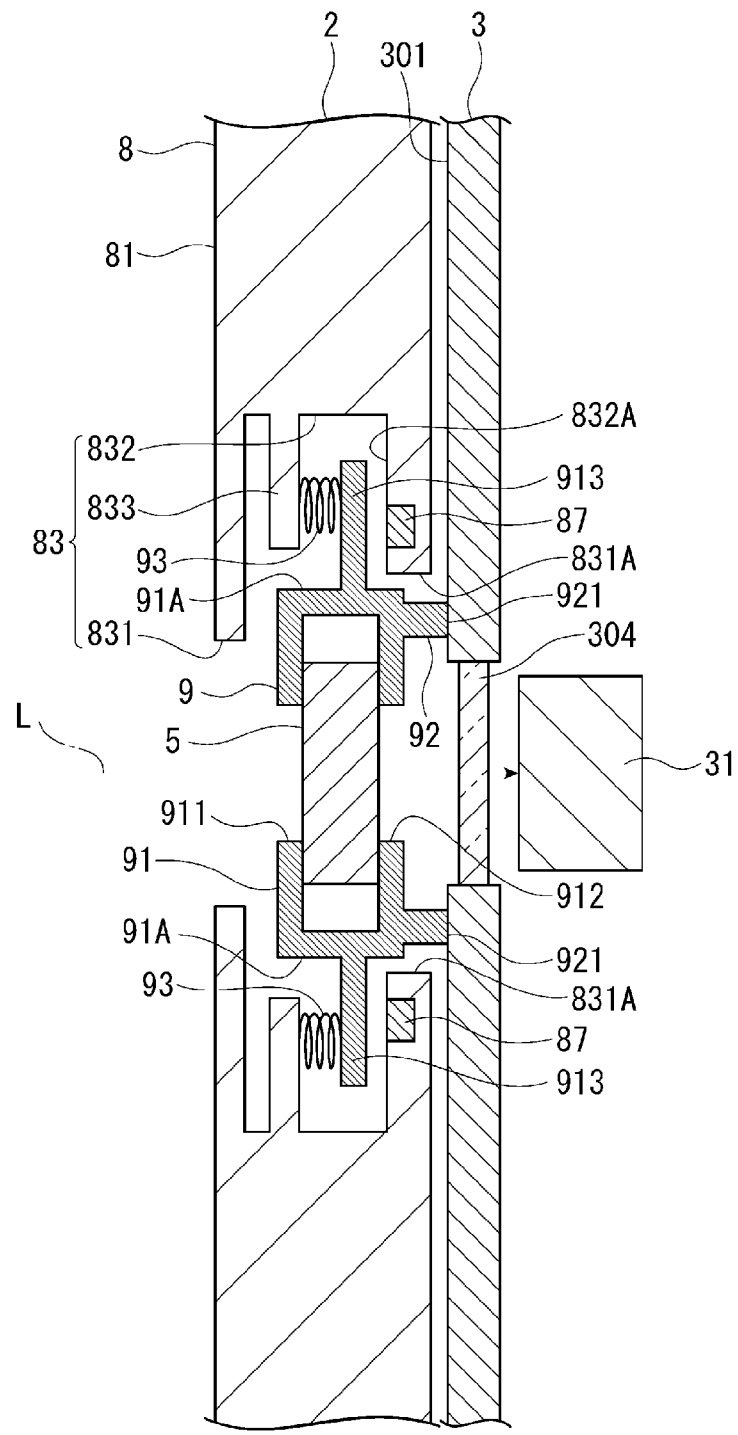
FIG. 18 is a spectrometry system schematically illustrating a modification example of the spectrometry system.

FIG. 18 is a cross-sectional view illustrating a schematic configuration of a modification example of the spectrometry system which can detect a positional deviation. In the present modification example, basically the same constituent elements as in the first embodiment are given the same reference numerals, and description thereof will be omitted.

As illustrated in FIG. 18, a plurality of distance sensors 87 which detect a tilt or a position of the imaging element 312 are provided. Each of the distance sensors 87 is provided in the groove 832 of the storage section 83 so as to oppose the surface of the flange 913 on the imaging apparatus 3 side during attachment. FIG. 18 illustrates an example in which a pair of distance sensors 87 is provided in the intersection direction, but the number of distance sensors 87 may be three or more and may be one. Three or more distance sensors 87 are provided, and thus a tilt of the casing 91, that is, a tilt of the wavelength variable interference filter 5 can be detected.

In the above-described respective embodiments, in a case where a tilt of the wavelength variable interference filter 5 with respect to the optical axis L is equal to or larger than a predetermined amount, a deviation detection notification image is displayed in order to send a notification of an error, but correction for the tilt may be further performed. For example, the fact is known that a selected wavelength changes depending on a tilt of the wavelength variable interference filter 5. Therefore, a driving parameter may be changed by changing the V-λ data depending on a tilt. In this case, the V-λ data may be acquired in advance through tests or the like, and may be selected depending on a tilt.

A tilt angle θ of the imaging element 312 with respect to the optical axis L may be detected, and the V-λ data may be updated. In other words, a driving voltage for a gap distance d which is the optimum for an aimed wavelength λ may be corrected according to mλ=2d cos θ(where m is an integer).

There may be a configuration in which an adjustment mechanism which adjusts a tilt or a distance is provided, and a tilt or a distance can be adjusted manually or automatically on the basis of a detection result.

In the above-described respective embodiments, a configuration has been exemplified in which the control unit 37 included in the imaging apparatus 3 controls an operation of the entire spectrometry system, but the invention is not limited thereto. For example, the spectroscopic module may include a control unit which controls an operation of the entire spectrometry system. In addition, there may be a configuration in which the spectroscopic module and the imaging apparatus respectively include control units, some of the respective functional portions related to the invention exemplified in the above-described control unit 37 are realized by the control unit included in the spectroscopic module, and others thereof are realized by the control unit included in the imaging apparatus.

In the above-described respective embodiments, a configuration has been exemplified in which the wavelength variable interference filter 5 is held by the casing 91 as a spectroscopic holding section according to the invention in a state of being stored therein, but the invention is not limited thereto. For example, in addition to the configuration in which the wavelength variable interference filter 5 is stored in the casing as a holding section, there may be a configuration in which the wavelength variable interference filter 5 is fixed to and held by a plate-shaped member as a holding section. In this case, other members such as an abutting part may be provided at the plate-shaped holding section.

In the above-described respective embodiments, the wavelength variable interference filter 5 has been exemplified as a spectroscopic unit, but the invention is not limited thereto, and, for example, an acousto-optic tunable filter (AOTF) or a liquid crystal tunable filter (LCTF) may be used. However, from the viewpoint of miniaturization of an apparatus, a Fabry-Perot filter is preferably used in the same manner as in the above-described respective embodiments.

Although the wavelength variable interference filter 5 which can change a selection wavelength has been exemplified as a spectroscopic unit, the invention is not limited thereto, and a Fabry-Perot filter which can extract only light with a predetermined wavelength, or various color filters may be used.

In the fifth embodiment, a configuration in which the wavelength variable interference filter 5 is used as a spectroscopic unit has been exemplified, but the invention is not limited thereto. In other words, even in a case where filters other than the wavelength variable interference filter 5 are used as a spectroscopic unit, a range of an allowable angle ψ differs depending on a configuration of the spectroscopic unit, but there is a concern that a measurement result with desired accuracy may not be acquired in a case where an incidence angle is out of a range of the allowable angle ψ. In the fifth embodiment, also in a case where filters other than the wavelength variable interference filter 5 are used as a spectroscopic unit, the allowable angle ψ is set according to a configuration of the spectroscopic unit, and thus it is possible to minimize a reduction in measurement accuracy.

A specific structure upon implementation of the invention may be configured through appropriate combinations of the above-described respective embodiments and modification examples within the scope of being capable of achieving the object of the invention, and may be changed to other structures as appropriate.

The entire disclosure of Japanese Patent Application No. 2013-270763 filed on Dec. 27, 2013 is expressly incorporated by reference herein.

What is claimed is:

1. A spectrometry system comprising:
an imaging apparatus that includes an imaging element which captures an image; and
a spectroscopic module that includes a spectroscopic unit and an attachment unit, the spectroscopic unit selectively emitting emitted light with a predetermined wavelength among first incident light and being able to change a wavelength of the emitted light, the attachment unit holding the spectroscopic unit, the attachment unit being attachable to and detachable from the imaging apparatus,
wherein the attachment unit includes a movable positioning portion that holds the spectroscopic unit, that positions the spectroscopic unit with respect to an optical axis when the spectroscopic module is attached to the imaging apparatus, and that allows the spectroscopic unit to move towards and away from the imaging apparatus along the optical axis,
wherein the movable positioning portion includes a casing that has an opening, the optical axis extending through the opening; and
wherein the positioning portion includes
a spectroscopic holding section that holds the spectroscopic unit, and that includes the casing;
an abutting section that is provided at the spectroscopic holding section, the abutting section protruding toward the imaging apparatus from the spectroscopic holding section, the abutting section having a front end surface in a protrusion direction to abut on the imaging apparatus; and
a biasing section that biases the spectroscopic holding section toward the imaging apparatus side.

2. The spectrometry system according to claim 1, wherein the attachment unit includes
a base at which the spectroscopic unit is provided, and that is disposed along a surface of the imaging apparatus on a light incidence side; and
a sidewall that is connected to the base, and covers a side surface of the imaging apparatus along an optical axis of the incident light during the attachment, and
wherein a plurality of protrusions which protrude in a direction intersecting the optical axis, and abut on the side surface during the attachment are provided on an inner surface of the sidewall.

3. The spectrometry system according to claim 2, wherein the attachment unit includes
a positioning portion that changes a position of the spectroscopic unit between an arrangement position where the spectroscopic unit is disposed on an optical path of the imaging element and a retraction position where the spectroscopic unit is retracted from the optical path.

4. The spectrometry system according to claim 1, wherein the attachment unit includes
a base at which the spectroscopic unit is provided, and that is disposed along a surface of the imaging apparatus on a light incidence side; and
a pinch portion that is provided at the base, and pinches the imaging apparatus from a direction intersecting an optical axis of the incident light during the attachment.

5. The spectrometry system according to claim 4, wherein the pinch portion includes
a first contact section that comes into contact with one of side surfaces which oppose each other among side surfaces of the imaging apparatus along the optical axis;
a second contact section that comes into contact with the other of the side surfaces; and
a connection section that connects the contact sections to each other so as to change a distance between the first contact section and the second contact section in the direction intersecting the optical axis, and allows the base to be moved between the contact sections, wherein the respective contact sections are brought into contact with the imaging apparatus from the direction intersecting the optical axis so as to pinch the imaging apparatus during the attachment.

6. The spectrometry system according to claim 1, wherein the spectroscopic module further includes:

a reference plate; and a movement mechanism that moves the reference plate between an arrangement position where the reference plate is disposed on an optical path of incident light to the imaging apparatus and a retraction position where the reference plate is retracted from the arrangement position.

7. The spectrometry system according to claim 1, wherein the spectroscopic module further includes a plurality of spectroscopic units that select the plurality of predetermined different wavelengths;

a changing unit that changes the spectroscopic unit which is disposed on an optical path of incident light to the imaging apparatus; and a positioning portion that holds the spectroscopic unit, and positions the spectroscopic unit with respect to an optical axis of the incident light during the attachment, wherein the positioning portion is provided in each of the plurality of spectroscopic units.

8. The spectrometry system according to claim 1, wherein the spectroscopic unit is a Fabry-Perot etalon.

9. The spectrometry system according to claim 1, further comprising:

a positional deviation detection unit that detects a positional deviation of the spectroscopic unit relative to the imaging apparatus.

10. The spectrometry system according to claim 9, wherein the positional deviation detection unit detects the positional deviation by detecting part of the spectroscopic module in a captured image on the basis of the captured image which is captured by the imaging apparatus.

11. The spectrometry system according to claim 1, further comprising:

a region specifying unit that specifies an image region corresponding to light incident to the spectroscopic unit in a predetermined angle range in a captured image which is captured by the imaging apparatus; and an analysis processing unit that performs an analysis process on the image region.

12. The spectrometry system according to claim 11, further comprising:

a display unit that displays an image; and a display control unit that displays a real-time image acquired by the imaging apparatus on the display unit, wherein the display control unit causes a range of an analysis region which is a target of the analysis process and is included in at least the image region, to overlap the real-time image and to be displayed.

13. A spectroscopic module comprising:

a spectroscopic unit that selectively emits light with a predetermined wavelength among first incident light, the spectroscopic unit being able to change a wavelength of the emitted light; and an attachment unit that holds the spectroscopic unit, the attachment unit being attachable to and detachable from an imaging apparatus including an imaging element which captures an image, the attachment unit being able to dispose the spectroscopic unit on an optical path to the imaging element when the attachment unit is attached to the imaging apparatus, wherein the attachment unit includes a movable positioning portion that holds the spectroscopic unit, that positions the spectroscopic unit with respect to the optical axis when the spectroscopic module is attached to the imaging apparatus, and that allows the spectroscopic unit to move towards and away from the imaging apparatus along the optical axis, wherein the movable positioning portion includes a casing that has an opening, the optical axis extending through the opening, and wherein the positioning portion includes a spectroscopic holding section that holds the spectroscopic unit, and that includes the casing;

an abutting section that is provided at the spectroscopic holding section, the abutting section protruding toward the imaging apparatus from the spectroscopic holding section, the abutting section having a front end surface in a protrusion direction to abut on the imaging apparatus; and a biasing section that biases the spectroscopic holding section toward the imaging apparatus side.

14. A positional deviation detection method performed in a spectrometry system including an imaging apparatus and a spectroscopic module, the method comprising:

causing the imaging apparatus to capture an image and to acquire a captured image; and detecting a positional deviation by detecting part of the spectroscopic module in the captured image, wherein the imaging apparatus includes an imaging element which captures an image, wherein the spectroscopic module includes a spectroscopic unit and an attachment unit, the spectroscopic unit selectively emits emitted light with a predetermined wavelength among first incident light and is able to change a wavelength of the emitted light, the attachment unit holds the spectroscopic unit, the attachment unit is attachable to and detachable from the imaging apparatus, and wherein a control unit which controls the imaging apparatus and the spectroscopic module is provided in at least one of the imaging apparatus and the spectroscopic module.

15. A spectrometry system comprising:

an imaging apparatus that includes an imaging element which captures an image; and a spectroscopic module that includes a spectroscopic unit and an attachment unit, the spectroscopic unit selectively passing passed light with a predetermined wavelength among first incident light, and being able to change a wavelength of the passed light, wherein the attachment unit holds the spectroscopic unit, and the attachment unit is attachable to and detachable from the imaging apparatus, and wherein the attachment unit includes a movable positioning portion that holds the spectroscopic unit, that positions the spectroscopic unit with respect to an optical axis when the spectroscopic module is attached to the imaging apparatus, and that allows the spectroscopic unit to move towards and away from the imaging apparatus along the optical axis, wherein the movable positioning portion includes a casing that has an opening, the optical axis extending through the opening, and wherein the positioning portion includes
- a spectroscopic holding section that holds the spectroscopic unit, and that includes the casing;
- an abutting section that is provided at the spectroscopic holding section, the abutting section protruding toward the imaging apparatus from the spectroscopic holding section, the abutting section having a front end surface in a protrusion direction to abut on the imaging apparatus; and
- a biasing section that biases the spectroscopic holding section toward the imaging apparatus side.

* * * * *